United States Patent
Fulks et al.

(10) Patent No.: US 7,460,936 B2
(45) Date of Patent: Dec. 2, 2008

(54) SYSTEM AND METHOD FOR CONTROLLING VEHICLE HYDRAULIC SYSTEM

(75) Inventors: Gary C. Fulks, Dayton, OH (US); Douglas E. Poole, Dayton, OH (US); John G. Noetzel, Brighton, MI (US)

(73) Assignee: Delphi Technologies, Inc., Troy, MI (US)

( * ) Notice: Subject to any disclaimer, the term of this patent is extended or adjusted under 35 U.S.C. 154(b) by 149 days.

(21) Appl. No.: 11/432,975

(22) Filed: May 12, 2006

(65) Prior Publication Data

US 2007/0265746 A1    Nov. 15, 2007

(51) Int. Cl.
B60T 11/28 (2006.01)

(52) U.S. Cl. .......... 701/36; 60/600
(58) Field of Classification Search .......... 701/36; 123/559.2, 559.3; 60/600, 605.2, 611
See application file for complete search history.

(56) References Cited

U.S. PATENT DOCUMENTS

| | | | | |
|---|---|---|---|---|
| 4,132,071 A | 1/1979 | Priese et al. | ......... | 60/328 |
| 4,598,626 A | 7/1986 | Walters et al. | ......... | 91/433 |
| 4,631,982 A | 12/1986 | Miki et al. | ......... | 74/869 |
| 4,659,150 A | 4/1987 | Kubota et al. | ......... | 303/6 C |
| 4,838,126 A | 6/1989 | Wilfinger et al. | ......... | 74/869 |
| 4,875,391 A | 10/1989 | Leising et al. | ......... | 74/866 |
| 4,943,756 A | 7/1990 | Conley, III et al. | ......... | 318/671 |
| 4,967,385 A * | 10/1990 | Brekkestran et al. | ......... | 702/105 |
| 4,998,200 A | 3/1991 | Glowczewski et al. | ... | 364/424.1 |
| 5,040,853 A | 8/1991 | Burgdorf et al. | ......... | 303/119 |
| 5,054,369 A * | 10/1991 | Wardle et al. | ......... | 91/361 |
| 5,417,626 A | 5/1995 | Gierer | ......... | 477/117 |
| 5,501,645 A | 3/1996 | Taniguchi et al. | ......... | 477/130 |
| 5,531,192 A | 7/1996 | Feucht et al. | ......... | 123/90.12 |
| 5,611,749 A | 3/1997 | Jang et al. | ......... | 477/65 |
| 5,643,123 A | 7/1997 | Jang et al. | ......... | 475/119 |
| 5,645,143 A | 7/1997 | Mohr et al. | ......... | 188/72.1 |
| 5,758,930 A | 6/1998 | Schiel et al. | ......... | 303/113.4 |
| 5,836,659 A | 11/1998 | Feigel et al. | ......... | 303/115.2 |
| 5,857,333 A | 1/1999 | Schmidt et al. | ......... | 60/469 |
| 6,003,960 A | 12/1999 | Gronau et al. | ......... | 303/167 |
| 6,033,035 A | 3/2000 | Neumann et al. | ......... | 303/113.4 |
| 6,082,834 A | 7/2000 | Kolbe et al. | ......... | 303/139 |
| 6,135,575 A | 10/2000 | Feigel et al. | ......... | 303/113.4 |
| 6,185,485 B1 | 2/2001 | Ashrafi et al. | ......... | 701/1 |
| 6,189,396 B1 | 2/2001 | Barnreiter et al. | ......... | 74/335 |

(Continued)

*Primary Examiner*—Dalena Tran
(74) *Attorney, Agent, or Firm*—Scott A. McBain

(57) ABSTRACT

A control system for controlling energization of a plurality of valves in a vehicle hydraulic system. The control system includes a plurality of sensors for measuring various dynamic conditions and operational aspects of the vehicle, a signal processing circuit coupled to the plurality of sensors for determining a desired energization of the plurality of valves dependent upon measurements by at least a portion of the plurality of sensors, and a driver circuit coupled to the signal processing circuit for generating, responsive to the desired energization of the plurality of valves as determined by the signal processing circuit, a control signal to energize the plurality of valves to the desired energization. The control system receives inputs from the plurality of vehicle sensors. These inputs are processed, and the processed inputs and signals derived from the inputs are forwarded to the driver circuit for use in generating a control signal for operating the vehicle valve system. In a particular embodiment, the valve system is controlled to operate a plurality of hydraulic actuators to provide a desired configuration of the vehicle.

20 Claims, 17 Drawing Sheets

U.S. PATENT DOCUMENTS

| | | |
|---|---|---|
| 6,254,108 B1 | 7/2001 | Germain et al. .......... 280/5.506 |
| 6,276,693 B1 | 8/2001 | Oakley et al. ............ 280/5.506 |
| 6,279,551 B1 * | 8/2001 | Iwano et al. ................ 123/564 |
| 6,298,941 B1 | 10/2001 | Spadafora ................... 180/422 |
| 6,315,370 B1 | 11/2001 | Feigel et al. ............. 303/115.2 |
| 6,381,954 B1 * | 5/2002 | Kakuyama et al. ............ 60/285 |
| 6,408,972 B1 | 6/2002 | Rodgers et al. ............. 180/197 |
| 6,498,973 B2 | 12/2002 | Dix et al. ...................... 701/50 |
| 6,550,873 B1 | 4/2003 | Hengler et al. .......... 303/119.3 |
| 6,567,733 B2 | 5/2003 | Popp et al. .................... 701/51 |
| 6,592,190 B2 | 7/2003 | Dunbar et al. ............. 303/9.61 |
| 6,625,982 B2 | 9/2003 | Van Den Bossche et al. .. 60/403 |
| 6,676,230 B2 * | 1/2004 | Kuno et al. ............... 303/114.3 |
| 2002/0087244 A1 | 7/2002 | Dix et al. ...................... 701/50 |
| 2003/0011240 A1 | 1/2003 | Dunbar et al. ................ 303/13 |
| 2004/0003787 A1 | 1/2004 | Allen ....................... 123/90.12 |
| 2004/0049330 A1 | 3/2004 | Fiorletta et al. ............... 701/37 |
| 2004/0098984 A1 | 5/2004 | Duell et al. .................... 60/431 |
| 2004/0183371 A1 | 9/2004 | Zheng et al. .............. 303/116.1 |
| 2005/0204587 A1 | 9/2005 | Kime .......................... 37/266 |
| 2006/0028064 A1 | 2/2006 | Beulich et al. .............. 303/137 |

* cited by examiner

SYSTEM AND METHOD FOR CONTROLLING VEHICLE HYDRAULIC SYSTEM

BACKGROUND

The present invention relates to vehicles with lean control systems. In particular, the present invention relates to a vehicle with a hydraulically-actuated primary and auxiliary lean control system coupled to a vehicle leaning suspension system for enhancing vehicle stability.

In a two-wheeled motorcycle moving at a speed within the range of approximately 0-15 mph, a combination of "in-phase" steering and lean angle control is used to achieve directional control of the motorcycle. As the vehicle speed increases, it is increasingly necessary to use "counter" or "out-of-phase" steering in conjunction with lean angle control to achieve directional control.

In a steady-state turn at speeds greater than approximately 15 mph, the net moment at the motorcycle center of gravity (CG) and the handlebar moment applied by the operator are both zero. In this case, the lean angle is such that the moment due to gravity and the moment due to lateral acceleration of the motorcycle are equal and opposite. An example of this is that, for a lateral acceleration on 1 G, a lean angle of approximately 45° is required for equilibrium in a steady state turn.

Above speeds greater than approximately 15 mph, the operator is able to apply an "out-of-phase" moment to the handlebar which, through wheel gyro effect, will result in moment about the motorcycle CG resulting in a corresponding rate of change of the lean angle. The resulting change in lean angle (or camber) causes the motorcycle to turn, thereby increasing lateral acceleration. By adjusting the handlebar moment, the operator is able to increase the rate of change of the lean angle, decrease the rate of change of the lean angle, or hold a steady-state condition with constant turn radius.

A three-wheeled motorcycle, or "trike", will be kinematically unable to achieve the lean angles possible with the two-wheeled motorcycle. For this reason, a different direction control strategy is required to facilitate vehicle stability during turns.

SUMMARY

In accordance with the present invention, a control system is provided for controlling energization of a plurality of valves in a hydraulic system. The control system includes a plurality of sensors, a signal processing circuit coupled to the plurality of sensors for determining a desired energization of the plurality of valves dependent upon measurements by at least a portion of the plurality of sensors, and a driver circuit coupled to the signal processing circuit for generating, responsive to the desired energization of the plurality of valves as determined by the signal processing circuit, a control signal to energize the plurality of valves to the desired energization.

In another aspect of the invention, a control system is provided for controlling a plurality of hydraulic actuators operatively coupled to a vehicle for providing a desired configuration of the vehicle. The control system includes a valve system coupled to the plurality of actuators for controlling a flow of pressurized fluid to the plurality of actuators, and a plurality of sensors for measuring vehicle parameters. An electronic controller is coupled to the plurality of sensors and includes a signal processing circuit for determining a desired energization of the plurality of valves corresponding to the desired configuration of the vehicle, dependent upon measurements by the plurality of sensors, and a driver circuit for generating, responsive to the desired configuration of the vehicle as determined by the signal processing circuit, a control signal to the valve system for controlling the flow of pressurized fluid to the plurality of actuators, to energize the plurality of actuators to provide the desired configuration of the vehicle.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and coupled and variations thereof are used broadly and encompass both direct and indirect mountings, connections, supports, and couplings. Further, "connected" and "coupled" are not restricted to physical or mechanical connections or couplings. Also as used herein, the "lean angle" of the vehicle is defined as the angle at which a tiltable or leanable portion of the vehicle leans with respect to a road or other surface on which the vehicle rests.

Figure 1:
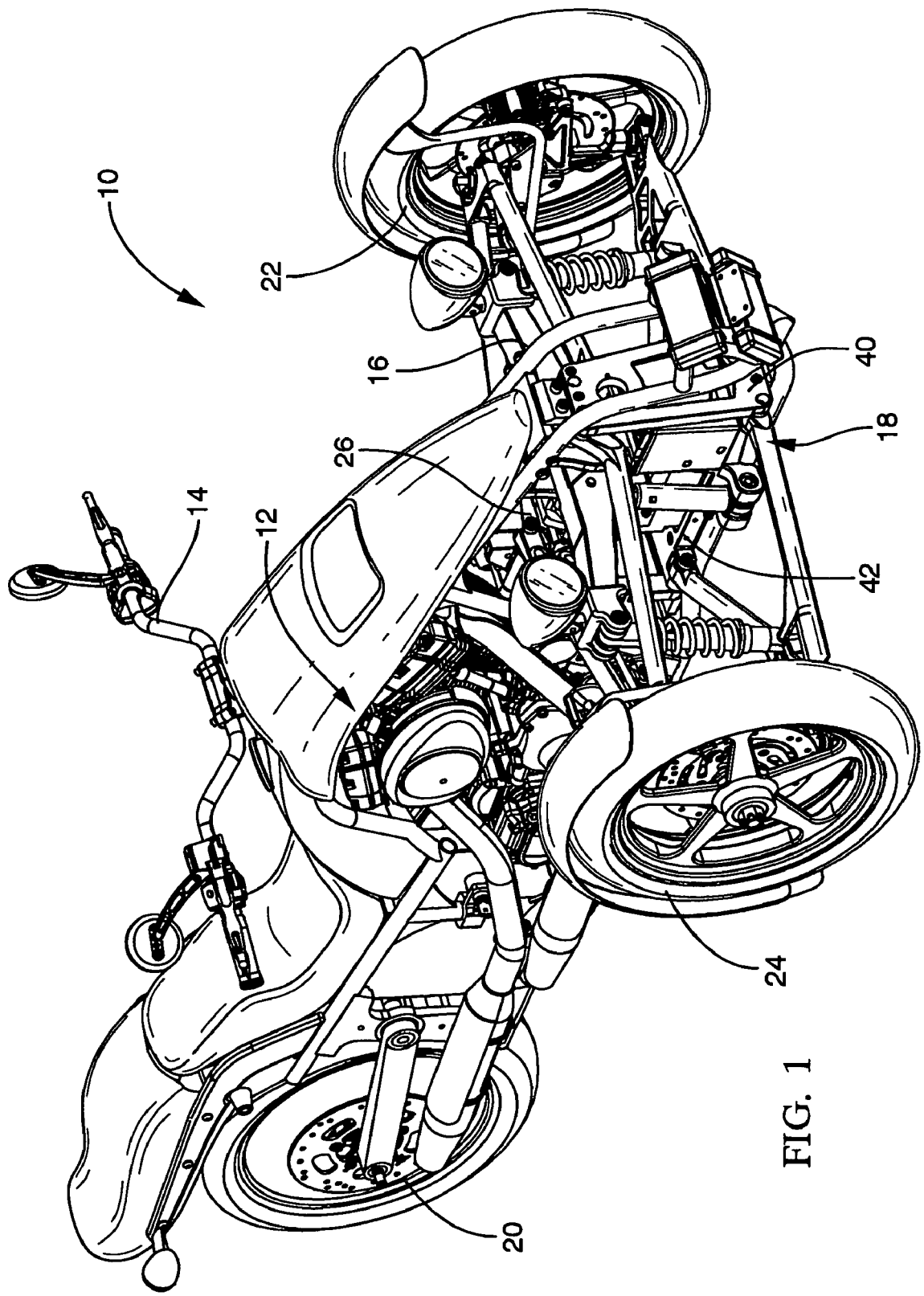
FIG. 1 is a perspective view of a three-wheeled motorcycle including a leaning front suspension coupled to an auxiliary lean control system embodying the present invention.
Figure 2:
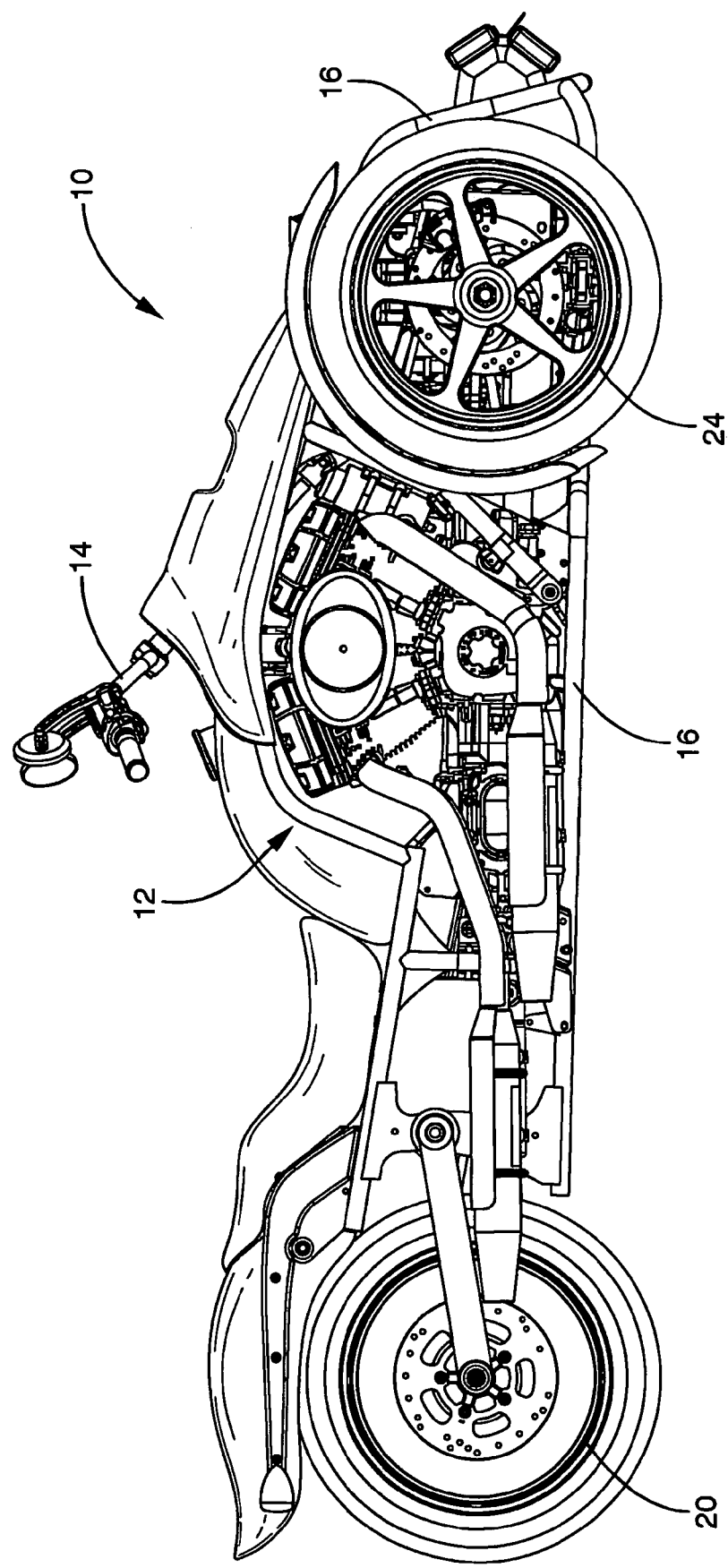
FIG. 2 is a side view of the three-wheeled motorcycle of FIG. 1.

FIGS. 1 and 2 illustrate a three-wheeled motorcycle or trike 10 having an engine 12, handlebars 14, a frame 16, a single rear wheel 20, first and second front wheels 22, 24, and an auxiliary lean control system 26. The rear wheel 20 is rotatably mounted to a rear portion of the frame 16, and the front wheels 22, 24 are coupled to the frame 16 via a leaning suspension system 18. The frame 16 includes a front bulkhead 40 and a main bulkhead 42 defining the front portion of the frame 16. The front bulkhead 40 is connected to the main bulkhead 42 to stiffen and strengthen the entire suspension system 18. The engine 12 is coupled to the rear wheel 20 through a drive assembly (not shown) to propel the trike 10. The handlebars 14 are pivotally coupled to the front portion of the frame 16 and coupled to the front wheels 22, 24 through a steering system to controllably turn the front wheels 22, 24.

The illustrated embodiment is for a trike 10 having two steerable front wheels 22, 24 and a single, driven rear wheel 20. It should be noted that it is within the scope of the invention to employ the suspension system and lean control systems of the present invention in a vehicle having two rear wheels and a single front wheel. Also, in other embodiments, the suspension system and lean control systems can be used for the front wheels, the rear wheels, or both the front and rear wheels in a vehicle having four wheels, such as an ATV.

Figure 3:
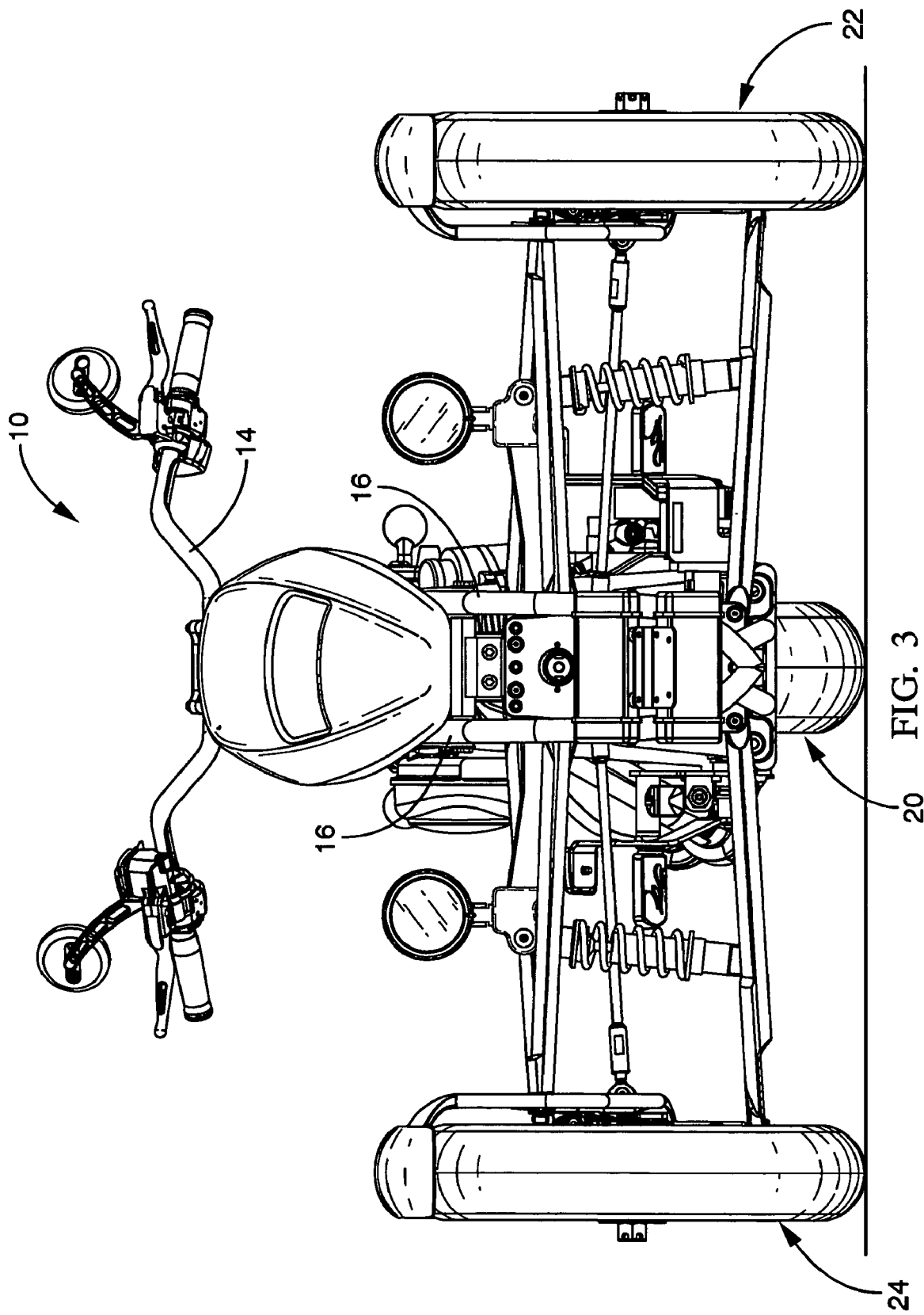
FIG. 3 is a front view of the three-wheeled motorcycle of FIG. 1, illustrating the three-wheeled motorcycle in an upright position.
Figure 4:
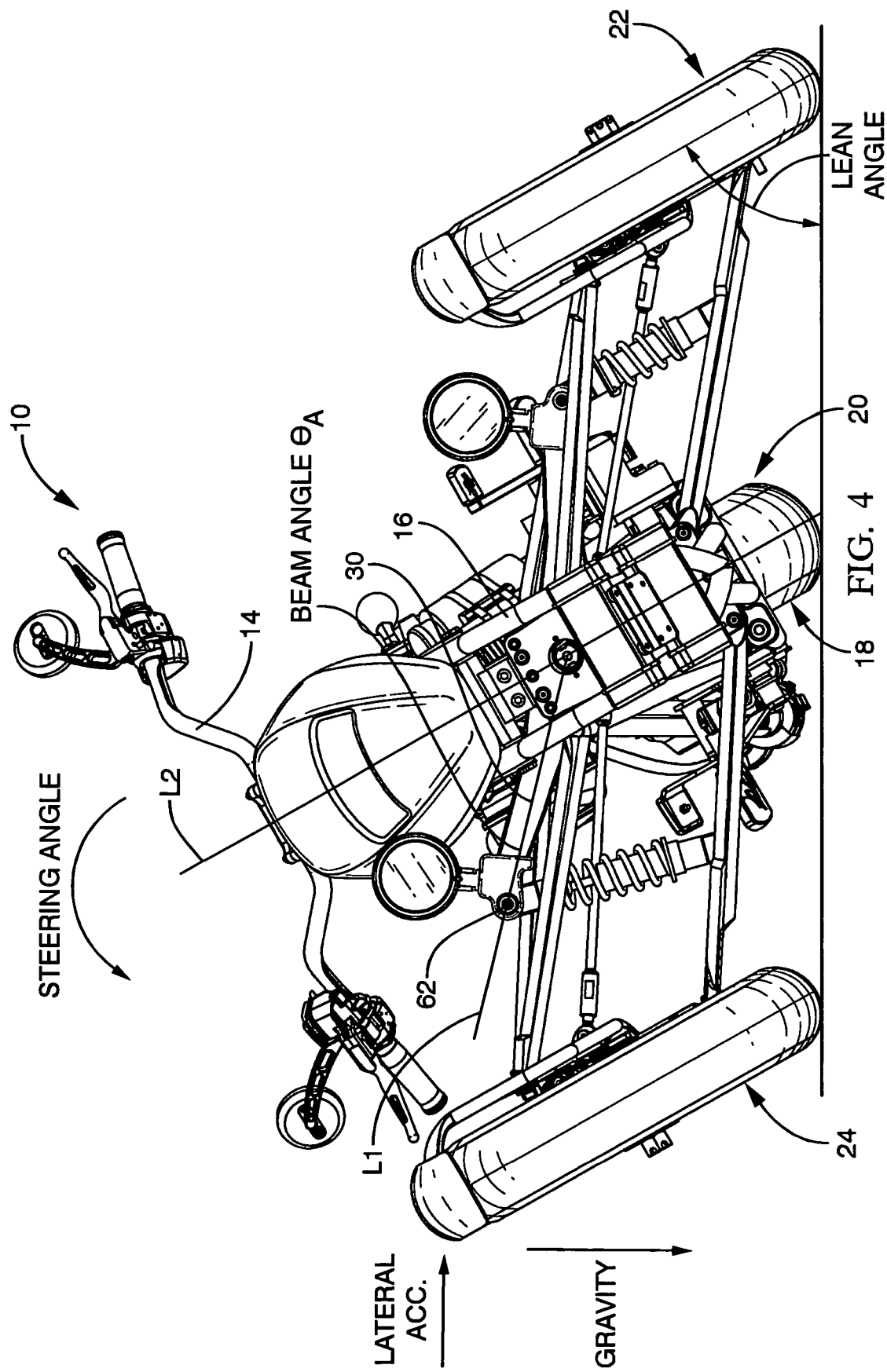
FIG. 4 is a front view of the three-wheeled motorcycle of FIG. 1, illustrating the three-wheeled motorcycle in a leaning position.

FIG. 3 illustrates a front view of the trike 10 of FIG. 1, showing the leaning suspension system 18 in an upright position. This position illustrates the orientation of the suspension system 18 while the trike 10 tracks a straight line on a flat surface. FIG. 4 illustrates the front view of the trike 10 in a leaning configuration. This view shows how the suspension system 18 is oriented when the trike 10 is turning, or tracking an arcuate path. It should be noted that in order to highlight the different positions of the suspension system 18 between FIGS. 3 and 4, the handlebar 14 and wheel 22, 24 positions are illustrated in the same center straightforward position for both FIGS. 3 and 4. Although this position is correctly illustrated in FIG. 3 the handlebar 14 position and the wheel 22, 24 positions in FIG. 4 should be pivoted and turned, respectively, toward or into the direction of the turn.

As used herein, the term "leaning suspension system" is defined as a suspension system that permits and/or facilitates leaning of a portion of the vehicle, wherein the leaning is initiated in response to forces exerted on the vehicle during turning of the vehicle by an active or passive lean control system installed in the vehicle.

Figure 5:
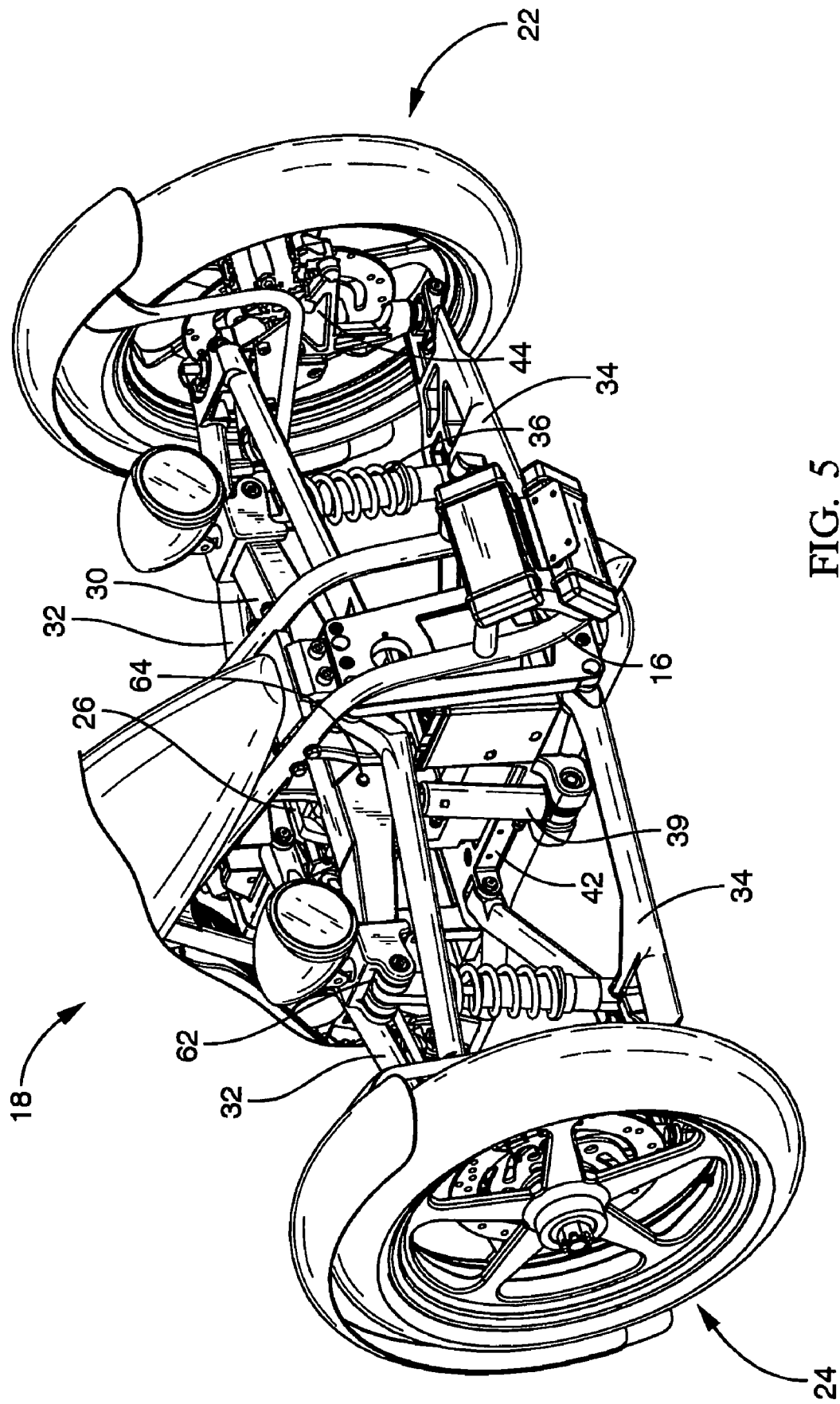
FIG. 5 is an enlarged perspective view of the front suspension of the three-wheeled motorcycle of FIG. 1.
Figure 6:
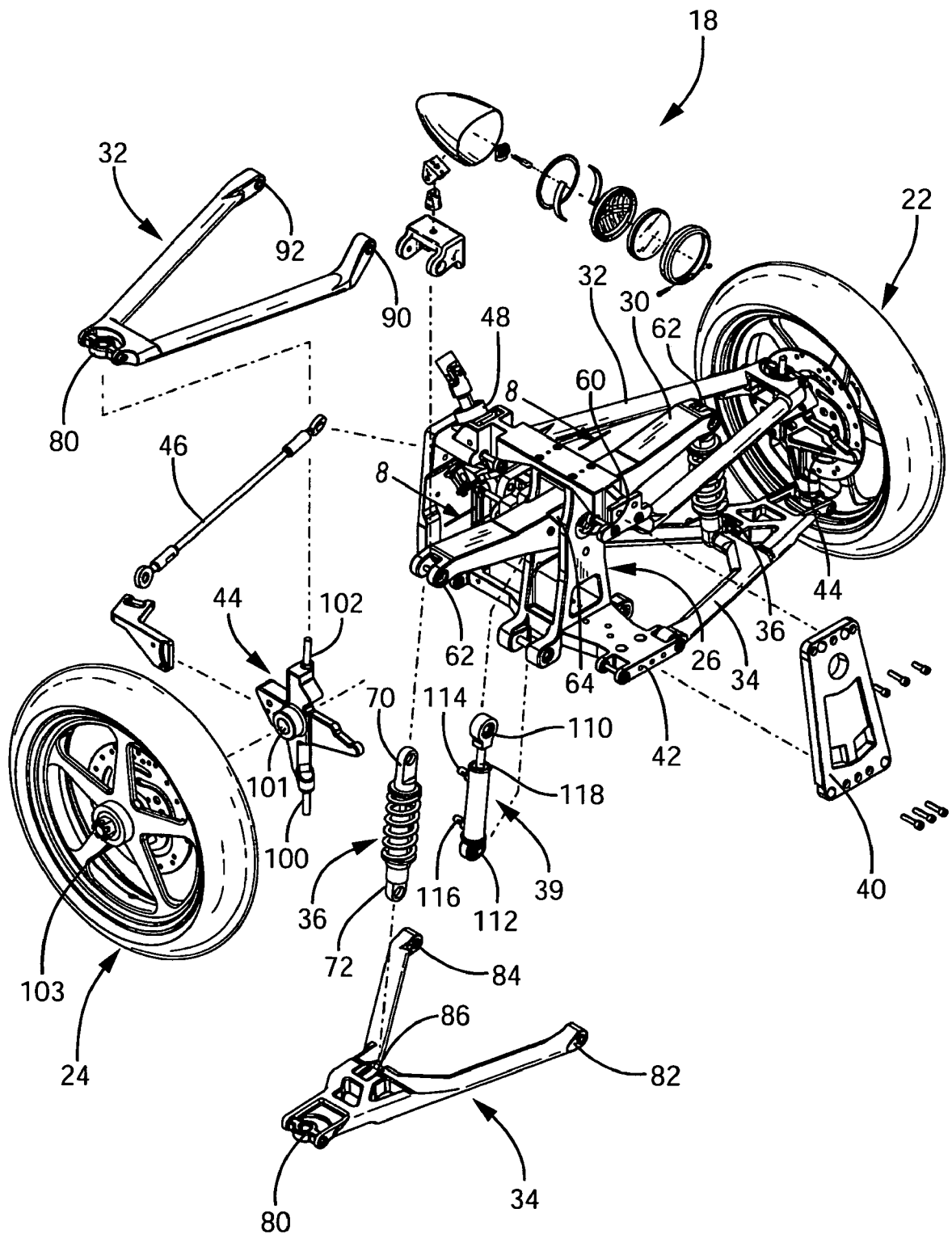
FIG. 6 is an exploded perspective view of the front suspension of the three-wheeled motorcycle shown in FIG. 5.

FIGS. 5 and 6 illustrate a perspective view and an exploded perspective view of the leaning suspension system 18, respectively. The leaning suspension system 18 includes a transverse beam 30, upper control arms 32, lower control arms 34, spring dampers 36, and spindles 44. The spindles 44 each include upper and lower pins 102, 100, as well as means for rotatably coupling to one of the front wheels 22, 24, such as a hole 101 for receiving a wheel axle 103. The structure of the spindle 44 is well known to those skilled in the art.

Figure 9:
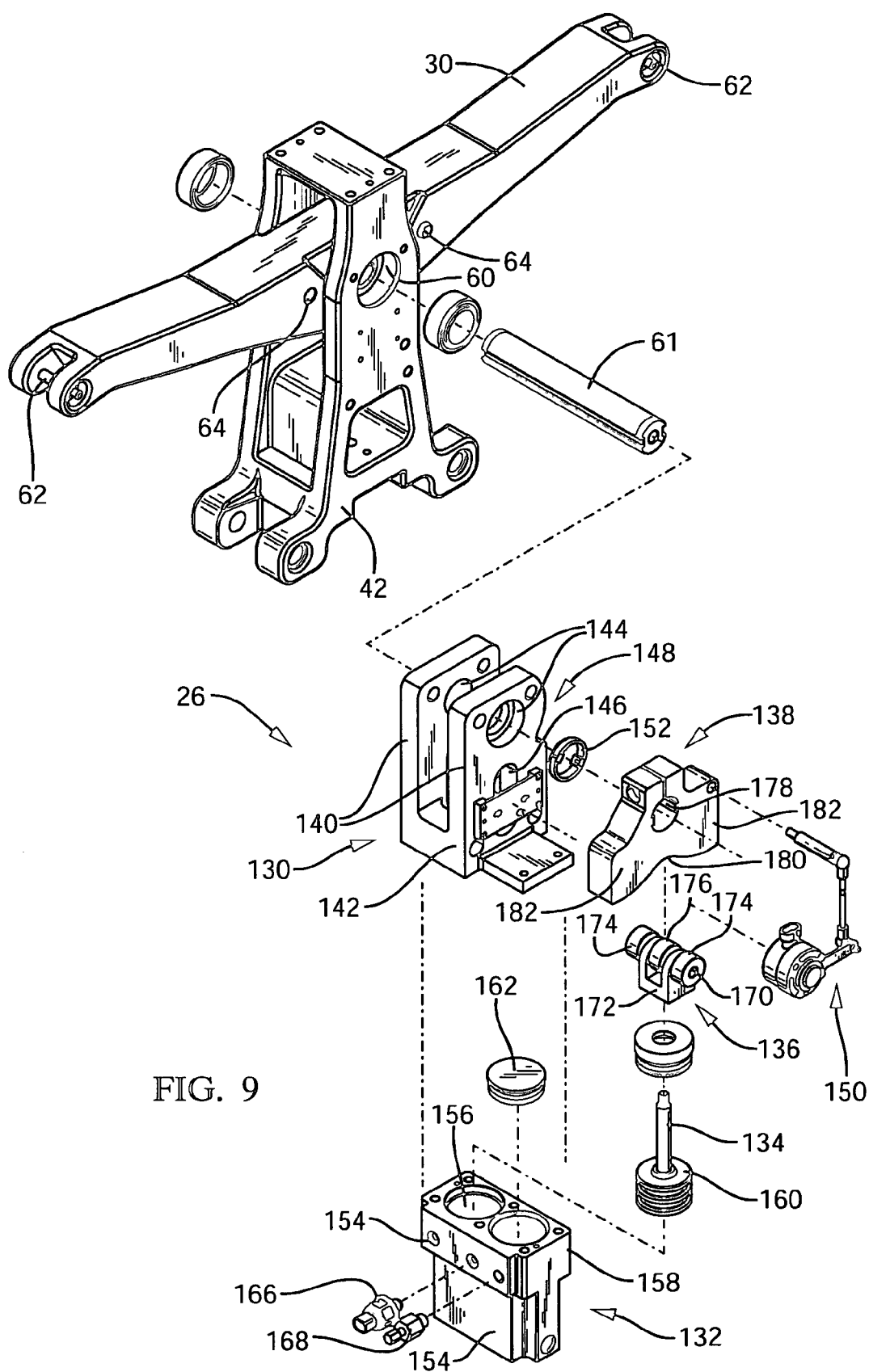
FIG. 9 is an exploded perspective view of one embodiment of the auxiliary lean control system for the three-wheeled motorcycle of FIG. 1.

The transverse beam 30 is rigid and remains substantially horizontal during operation of the trike 10. The transverse beam 30 has a center pivot point 60, end pivot points 62, and intermediate pivot points 64. In the embodiment shown in FIGS. 5 and 6, transverse beam 30 is pivotally coupled to a portion of the main bulkhead 42 at the center pivot 60 using a keyed shaft 61 (FIG. 9). However, other methods of coupling beam 30 to main bulkhead 42 are also contemplated. The center pivot 60 is positioned to coincide with a longitudinal centerline of the trike 10 and defines a pivot axis that is parallel to the vehicle centerline. The end pivot points 62 are pivotally coupled to upper pivots 70 on the spring dampers 36.

The lower control arms 34 have trunnions 80 rotatably coupled to one end and adapted to rotatably receive the lower pin 100 on the spindles 44. These trunnions 80 allow the suspension to operate independent of wheel steering by permitting the spindles 44 to pivot and turn regardless of the position of the lower control arms 34. The two remaining ends of the lower control arms 34 include front and rear pivot points 82, 84 that are pivotally connected to the main bulkhead 42. Central pivot 86 is located centrally on the lower control arms 34 and is adapted to pivotally couple to lower pivot points 72 on the spring dampers 36.

The upper control arms 32 also have trunnions 80 rotatably coupled to one end adapted to rotatably receive the upper pin 102 on the spindles 44. These trunnions 80 allow the suspension to operate independent of wheel steering. The two remaining ends of the upper control arms 32 include front and rear pivot points 90, 92 that are pivotally connected to the main bulkhead 42.

In the illustrated embodiment, the transverse beam 30 is positioned between the front and rear pivots 90, 92 on the upper control arms 32. In other embodiments, the transverse beam 30 could be positioned in front of the front pivots 90, behind the rear pivots 92, or coupled to a different location than the upper control arms 32 (i.e. coupled to a different bulkhead).

As mentioned above, the spring dampers 36 include upper and lower pivot points 70, 72 connecting the transverse beam 30 to the lower control arms 34. The spring dampers 36 include a shock-absorbing member surrounded by a biasing member. This style of spring damper 36 is well known to those skilled in the art, and will not be discussed in further detail. Alternative embodiments may utilize a different method of biasing and shock absorbing, such as leaf springs, coil springs, or air springs.

Referring again to FIG. 6, the substantially horizontal orientation of the transverse beam 30 is maintained by the influence of the spring dampers 36. The lower control arms 34 are connected to the front wheels 22, 24 through the spindles 44 and to the transverse beam 30 by the spring dampers 36. The front wheels 22, 24, and thus the lower control arms 34, remain substantially parallel to the road during normal operation. The road is generally substantially planar for the width of the trike 10, meaning that as long as both front wheels 22, 24 are in contact with the road, whether cornering or tracking a straight line, the spring dampers 36 will bias the transverse beam 30 to an orientation substantially parallel to the road.

The steering system includes spindles 44, tie rods 46, and the steering box 48. The handlebars 14 are coupled to the steering box 48 such that when an operator turns the handlebars 14, an output shaft (not shown) on the steering box 48 rotates. The output shaft is pivotally coupled to a first end of each tie rod 46. The second end of each tie rod 46 is pivotally coupled to one of the spindles 44. As the output shaft on the steering box 48 rotates, the tie rods 46 follow, pulling one spindle 44 and pushing the other. The spindles 44 are rotatably coupled to the upper and lower control arms 32, 34 by upper and lower pins 102, 100. Thus the pushing or pulling action initiated by the tie rods 46 causes the spindles 44, and thus the front wheels 22, 24, to rotate about the upper and lower pins 102, 100.

A hydraulically-energized primary lean control system affects a configuration of the vehicle, specifically the attitude or orientation of vehicle bulkheads 40 and 42 with respect to the ground on which the vehicle rests. Referring again to FIG. 6, the primary lean control system includes hydraulic actuators 38, 39 having upper and lower pivot points 110, 112, respectively. It is understood that actuator 38 is positioned on an opposite side of vehicle bulkheads 40, 42 from actuator 39 and is, therefore, not visible in FIG. 6. The illustrated embodiment shows the upper pivot points 110 of the hydraulic actuators 38, 39 are pivotally coupled to respective intermediate pivot points 64 on the transverse beam 30 at a location between the center pivot point 60 and one of the end pivot points 62. Other embodiments could include the hydraulic actuators 38, 39 pivotally coupled to respective end pivot points 62 and the spring dampers 36 pivotally coupled to the transverse beam 30 at a location between the center pivot point 60 and a respective one of the end pivot points 62. The hydraulic actuators 38, 39 and spring dampers can also be pivotally coupled to other points along the transverse beam 30.

In a manner explained in greater detail below, the hydraulic actuators 38, 39 act to control the orientation of the trike 10 during normal vehicle operation. When entering a turn, one of the hydraulic actuators 38, 39 extends in length while the other retracts, moving the trike 10 into a leaning position as illustrated in FIG. 4. When the trike 10 is leaving the turn, the hydraulic actuators 38, 39 act to bring the trike 10 back to a vertical or upright orientation as illustrated in FIG. 3.

As stated previously, upon failure, deactivation, or malfunctioning of the primary lean control system, it is desirable that the vehicle is returned to and maintains an upright (no lean) configuration until hydraulic control can be restored. It is also desirable that this upright configuration of the vehicle, in the absence of hydraulic control, be as stable as possible.

Figure 7:
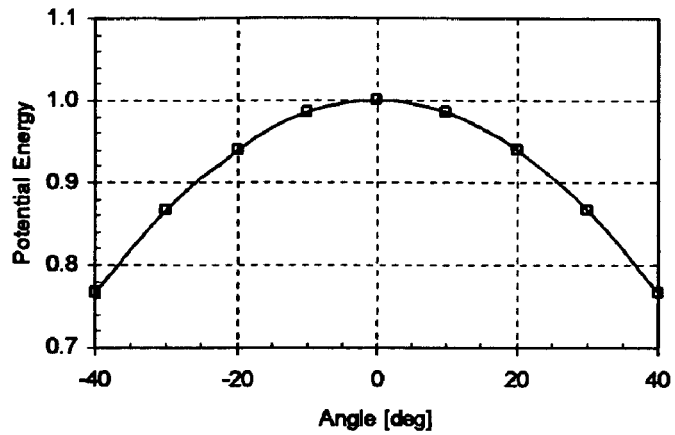
FIG. 7 is a graphical representation of a potential energy function describing the vehicle state during operation of a primary lean control system of the vehicle.

Instability in the configuration of the vehicle may be characterized as a relatively greater amount of potential energy stored within the configuration of the vehicle system. FIG. 7 is a graphical representation of a potential energy function describing the vehicle state during operation of the primary vehicle lean control system. In FIG. 7, the stability is expressed as a potential energy function of the vehicle system in a static case (i.e., when the vehicle velocity is zero), with a lower system potential energy reflecting a more stable orientation of the vehicle. In FIG. 7, the potential energy of the vehicle system is shown as a function of the lean angle of the vehicle provided by the vehicle lean control system. As seen in FIG. 7, the potential energy of the vehicle system is relatively lower at greater lean angles, due to a shift of the vehicle center of gravity to a position of lesser elevation. In contrast, a relatively less stable vehicle configuration is represented in FIG. 7 by a relative maximum potential energy of the system, which occurs when the vehicle is in the upright or on-center position. At a lean angle of zero degrees (i.e., when the vehicle is in an upright position), the vehicle center of gravity is at its highest point, and the vehicle system potential energy is relatively high.

In view of the above, upon failure, malfunction, or deactivation of the primary lean control system, it is desirable to achieve a predetermined vehicle lean angle which is closest to an upright position of the vehicle and at which the vehicle system has a relatively low potential energy. In the present invention, this is accomplished by employing an auxiliary lean control system which brings the vehicle body to a desired, predetermined lean angle upon failure, malfunction, or deactivation of the primary lean control system. In general, the energy applied by the auxiliary lean control system to adjust the lean angle to a predetermined value necessary for maximum stability will depend on the difference between the current lean angle of the vehicle and the desired predetermined lean angle of the vehicle. The auxiliary lean control system stores a quantity of energy sufficient to return a portion of the vehicle to the desired predetermined lean angle for stability.

Figure 8:
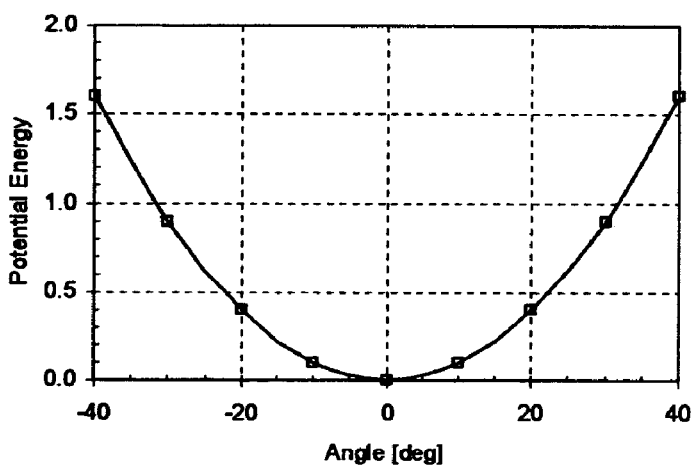
FIG. 8 is a graphical representation of a potential energy function of an auxiliary lean control system operable upon deactivation or malfunction of the primary lean control system.

In a particular embodiment illustrating the principles of the present invention, it is desirable that the vehicle system have a relatively low potential energy when the vehicle is in an upright position (i.e., when the vehicle has a lean angle of approximately zero) and resting on a substantially flat surface. FIG. 8 is a graphical representation of a potential energy function of an auxiliary lean control system in accordance with the present invention. FIG. 8 illustrates the energy input into the vehicle system by the auxiliary lean control system to adjust the lean angle of a portion of the vehicle to approximately zero, as a function of the lean angle of the portion of the vehicle when the primary lean control system becomes inactive. As seen in FIG. 8, the potential energy input by the auxiliary lean control system is greatest at the largest vehicle lean angle shown because the greater the difference between the existing vehicle lean angle and the desired predetermined lean angle for vehicle stability (in this case zero degrees), the greater the energy that must be expended by the auxiliary system in returning the vehicle to the desired predetermined lean angle.

The force required to adjust the vehicle lean angle (or other vehicle orientation parameter) can be transmitted to the suspension system via any of a variety of known alternative means (for example, using a crank mechanism). The actual structure utilized will depend on the specifics of the application and the interface of the articulation system hydraulics.

FIG. 9 is an exploded view of one embodiment of an auxiliary lean control system 26 in accordance with the present invention, coupled to transverse beam 30. Auxiliary lean control system 26 generally includes an energy storage device for storing energy to actuate the lean control system, a stabilizing mechanism coupled to the energy storage device and to the leanable portion of the vehicle for applying energy received from the energy storage device to the leanable portion of the vehicle, and a linkage coupled to the energy storage device and to the stabilizing mechanism for transferring energy from the energy storage device to the stabilizing mechanism.

In the embodiment shown in FIG. 9, the energy storage device comprises a power cylinder 132 coupled to a portion of the main bulkhead 42 below the frame 130, the linkage comprises a shaft 134, and the stabilizing mechanism comprises a roller assembly 136 and a cam 138. A frame 130 is coupled to a portion of the main bulkhead 42 adjacent the transverse beam 30 and includes two parallel plates 140 extending vertically from a base 142. The plates 140 are substantially identical, but one of the plates includes a clearance cut 148 to allow full rotation of an angle sensor 150 connected to the cam 138. Both plates 140 define a central aperture 144 aligned with the center pivot point 60 of the transverse beam 30 and a guide slot 146 for the roller assembly 136. The central aperture 144 defined by each plate 140 is adapted to rotatably support the keyed shaft 61 using a bushing 152. The guide slot 146 extends vertically below the central aperture 144, and provides a limiting path of travel for the roller assembly 136.

The power cylinder 132 is coupled to a portion of the main bulkhead 42 below the frame 130, and is coupled to the base 142 of the frame 130. The power cylinder 132 includes a housing 154, first and second cylinders 156, 158, a piston 160 movable inside the first cylinder 156, and a cap 162 sealing the second cylinder 158. The cylinders 156, 158 are in fluid communication through an aperture (not shown) at the bottom of the cylinders 156, 158. The circumference of the piston 160 forms a seal with the inner wall of the first cylinder 156. The volume of the first cylinder 156 above the piston 160 is in fluid communication with a hydraulic system 200 of the trike 10, and the second cylinder 158 (and thus the volume of the first cylinder 156 below the piston 160), is filled with a compressible fluid, such as a pressurized gas. Although the energy source for the embodiment of the auxiliary lean control system described herein comprises a compressible fluid, alternative energy sources are also contemplated, for example, a hydraulic sub-system or a spring system.

The shaft 134 is coupled to the piston 160 at a first end, and coupled to the roller assembly 136 at a second end, such that linear movement of the piston 160 along an axis defined by the first cylinder 156 will cause the roller assembly 136 to move in the same fashion.

The power cylinder 132 includes a hydraulic port 164, a pressure sensor 166, and a gas fitting 168. The hydraulic port 164 allows the first cylinder 156 to be placed in fluid communication with the hydraulic system 200 of the trike 10. The pressure sensor 166 allows the pressure in the first cylinder 156 to be monitored by the electronic control system. The gas fitting 168 allows the second cylinder 158 to be filled with the pressurized gas.

The roller assembly 136 includes three individual rollers 174, 176 connected by a roller shaft 170. A roller body 172 is coupled to the second end of the shaft 134 and is adapted to rotatably support the roller shaft 170. The rollers 174 at the ends of the roller shaft 170 move within the guide slots 146 in the frame 130. The center roller 176 is adapted to move toward the cam 138 when the piston 160 moves upward in the first cylinder 156, and move away from the cam 138 when the piston 160 moves downward in the first cylinder 156.

The cam 138 includes a central aperture 178, a roller recess 180, and two protruding lobes 182. The keyed shaft 61 extends through the aperture 178 to support the cam 138 between the two parallel plates 140 of the frame 130. The roller recess 180 is positioned between the protruding cam lobes 182, and has a profile matching that of the center roller 176. The lobes 182 are angularly offset from each other, and include substantially identical inner profiles adapted to engage the center roller 176.

Figure 13:
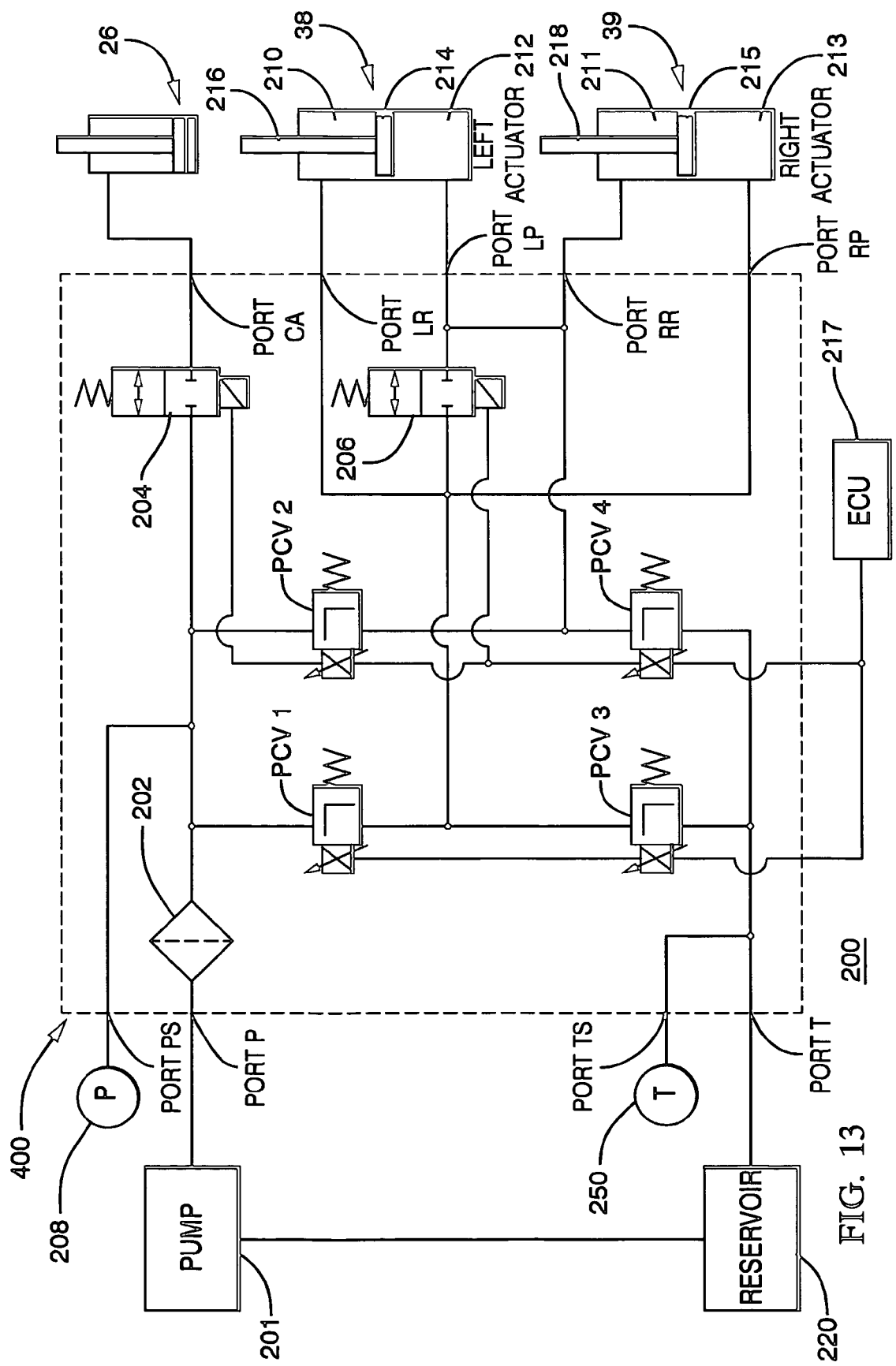
FIG. 13 is a schematic illustrating a hydraulic system for actuating the primary and auxiliary lean control systems of the three-wheeled motorcycle of FIG. 1.

FIG. 13 is a schematic illustrating one embodiment of a hydraulic system 200 for powering the primary and auxiliary lean control systems to produce a desired configuration of the vehicle defining a desired vehicle lean angle.

As used herein, the term "configuration" as applied to the vehicle (or a portion thereof) refers to a particular arrangement of the parts or elements of the vehicle. For example, a first configuration of the vehicle may comprise the particular arrangement of the vehicle elements when a portion of the vehicle resides at a first lean angle, while a second configuration of the vehicle comprises a particular arrangement of the vehicle elements when the portion of the vehicle resides at a second lean angle different from the first lean angle. Stated another way, the vehicle has a different configuration at each different leftward lean angle and at each different rightward lean angle.

The basic components of hydraulic system 200 include actuators for providing the desired configuration of the vehicle, a supply of pressurized fluid for the actuators, and a valve system operatively coupled to the actuators for controlling a flow of the pressurized fluid to the plurality of actuators. When a portion of the vehicle is to be leaned a desired amount to the right, the valve system controls the flow of pressurized fluid to the actuators to produce a first configuration of a plurality of first configurations of the vehicle corresponding to the desired configuration of the vehicle. In this case, the plurality of first configurations of the vehicle comprises a range of rightward lean angles, and the desired configuration is the particular right lean angle of the vehicle determined to be necessary according to the current movement conditions of the vehicle. Similarly, when a portion of the vehicle is to be leaned a desired amount to the left, the valve system controls the flow of pressurized fluid to the actuators to produce a second configuration of a plurality of second configurations of the vehicle corresponding to the desired configuration of the vehicle. In this case, the plurality of second configurations of the vehicle comprises a range of leftward lean angles, and the desired configuration is the particular left lean angle of the vehicle determined to be necessary according to the current movement conditions of the vehicle. Thus, the configuration of the vehicle is adjusted in response to the configuration needed to provide the desired lean angle.

Referring to FIG. 13, hydraulic system 200 includes a pump 201 for providing a supply of pressurized hydraulic fluid to the system, a filter 202, a plurality of proportional control valves PCV1-PCV4, a centering enable valve 206, a centering valve 204 including auxiliary lean control system power cylinder 132, and hydraulic actuators 38, 39 (previously described).

In the particular embodiment shown in FIG. 13, filter 202, proportional control valves PCV1-PCV4, centering enable valve 206, and centering valve 204 are all integrated into a unitary valve block, generally designated 400. This arrangement reduces valve leakage, greatly simplifies installation and maintenance of these portions of the hydraulic system, and greatly reduces the amount of connective tubing needed for interconnecting the various elements of the hydraulic system.

In the embodiment shown in FIG. 13, fluid is circulated from a reservoir 220 through hydraulic system 200 by pump 201. Pump 201 is a continuous flow pump (for example, a fixed positive-displacement pump). Hydraulic fluid is routed along various internal passages within valve block 400 in accordance with the states (i.e., totally open or closed, partially open or closed, etc.) of proportional control valves PCV1-PCV4, centering valve 204, and centering enable valve 206. The states of valves PCV1-PCV4 are set by output signals from an electronic control unit or controller (ECU) 217 responsive to inputs from various vehicle sensors, as described in greater detail below.

A pressure filter or strainer 202 is provided for filtering impurities from the hydraulic fluid prior to fluid entry into valve block 400. In the embodiment shown in FIG. 13, the filter media is incorporated into valve block 400. Alternatively, filter 202 may be incorporated into the hydraulic system between pump 201 and valve block 400, or the filter may be installed in reservoir 220.

In the embodiment shown in FIG. 13, proportional control valves PCV1-PCV4 are solenoid-actuated spool valves adapted for controlling the speed and direction of hydraulic fluid flowing through valve block 400. Alternatively, depending on the force requirements of a particular application, pilot-solenoid valves may be used. As is known in the art, this type of valve uses a solenoid to control the flow of a pressurized fluid which powers an actuator that shifts the main flow-directing element of the valve.

The four proportional pressure control valves PCV1-PCV4, control fluid flow and pressure to the hydraulic actuators 38 and 39. In the embodiment shown in FIG. 13, PCV1 and PCV4 are controlled together and PCV2 and PCV3 are controlled together. This configuration permits control of actuators 38 and 39 using only two electronic drivers.

Each of valves PCV1-PCV4 receives a control signal from electronic control unit (ECU) 217. In the embodiment shown in FIG. 13, each of valves PCV1-PCV4 is normally open. Thus, a control current generated by (or controlled by) ECU 217 is applied to the solenoid of each valve to constrict one or more respective fluid flow paths through the valve, to a degree proportional to the applied current. In the spool valves used in the described embodiment, the displacement of the spool controlling opening and closing of the flow paths will be proportional to the applied current. As the valves are proportional control valves, the flow path through each valve may be constricted to any desired degree by the application of a proportionate current to an associated solenoid.

FIG. 13 also shows a hydraulic circuit configured for synchronized control of two hydraulic actuators 38, 39. However, a hydraulic system as described herein could incorporate additional fluid control elements (for example, additional valves) for coordinated or integrated control of corresponding additional hydraulically-actuated elements (for example, cylinders, rotary actuators, bladder actuators, vane actuators, etc.), depending on the design requirements of the system.

Although the present embodiment utilizes a control system including solenoid valves actuated by an electronic control unit, alternative flow control systems may be used. For example, the flow control valves may be actuated mechanically or hydraulically, rather than electrically. Similarly, the valve controller may operate pneumatically or hydraulically, rather than electronically.

In the embodiment shown in FIG. 13, hydraulic actuators 38, 39 are conventional double-acting cylinders. Referring again to FIG. 6, hydraulic actuators 38, 39 include top fluid chambers 210, 211 and bottom fluid chambers 212, 213, respectively. In actuator 38, fluid chambers 210 and 212 are defined by a movable piston 214 rigidly connected to a shaft 216, while in actuator 39, fluid chambers 211 and 213 are defined by a movable piston 215 rigidly connected to a shaft 218. It is understood that actuator 38 is positioned on an opposite side of vehicle bulkheads 40, 42 from actuator 39 and is, therefore, not visible in FIG. 6. However, it is also understood that cylinder 38 is structurally substantially identical to cylinder 39, and that both cylinders operate in the substantially the same manner. Although the embodiment shown in FIGS. 6 and 13 utilizes double-acting cylinders, other types of actuators may be used in place of (or in addition to) cylinders 38, 39, depending on the application. For example, rotary actuators, bladder actuators, vane actuators, etc., are also contemplated.

Referring again to FIGS. 6 and 13, the hydraulic actuators 38, 39 have top and bottom fluid ports 114, 116. Piston 214 is provided at the end of shaft 216 within cylinder 38, and piston 215 is provided at the end of shaft 218 within cylinder 39. When hydraulic fluid is forced into the top fluid port 114 (into either of top fluid chambers 210, 211) by hydraulic pump 201, the associated piston 214 or 215 is forced down, and the associated shaft 216 or 218 retracts. While this is happening, hydraulic fluid is being forced out of the bottom fluid port 116 (i.e., out of either of bottom fluid chambers 212, 213) and into reservoir 211. When hydraulic fluid is forced into the bottom fluid port 116, the associated piston 214 or 215 is forced up, and the associated shaft 216 or 218 extends. While this is happening, hydraulic fluid is being forced out of the top fluid port 114 and into the reservoir.

The hydraulic system is controlled by an electronic control unit or system (ECU) 217. ECU 217 generates, responsive to the desired configuration of the vehicle, a control signal for controlling the valves to control the flow of the pressurized fluid so as to achieve the desired vehicle configuration, or lean angle. The general configuration of the electronic control unit is known in the art. In one embodiment, the electronic control unit of the present invention comprises a programmable digital computing apparatus having a processor, ROM, RAM and I/O apparatus coupled to sensor elements (not shown) and actuatable elements of the vehicle. The electronic control unit stores and runs a control program while the vehicle is in use. The sensor elements supply control-related data to ECU 217. The ECU receives input signals from the vehicle sensors (for example, signals indicative of vehicle road speed, the steering angle of the trike handlebars, etc.) and delivers output control signals to the actuatable elements of the vehicle responsive to the input signals. Examples of ECU outputs include a current for energizing a solenoid used to actuate one or more of valves PCV1-PCV4, or a control signal resulting in the supply of suitable currents to the solenoids. As in known in the art, the control signals transmitted by ECU 217 to the valves may be pulse-width modulated to overcome the effects of stiction on the spool. Alternatively, electronic dithering may be utilized to reduce or eliminate stiction effects. A typical control unit is described in U.S. Pat. No. 6,564,129, incorporated herein by reference.

Referring again to FIG. 13, a hydraulic system failure may occur in which hydraulic fluid is trapped in the hydraulic lines between either hydraulic actuator chambers 210 and 213, or in the hydraulic lines between actuator chambers 211 and 212. This could occur if, for example, the ECU 217 malfunctions and doesn't allow valves PCV3 or PCV4 to open. In this case, the hydraulic actuators 38, 39 may become locked in whatever their current state is, thereby possibly locking the trike in a leaning position. This would prevent the auxiliary lean control system 26 from operating, as the auxiliary lean control system would be incapable of exerting enough force to overcome the force exerted on the transverse beam 30 by the trapped hydraulic fluid.

To prevent this, a centering enable valve 206 is provided. During normal operation, centering enable valve 206 is energized to operationally isolate the portion of the hydraulic system supplying fluid to actuators 38, 39 (i.e., the upstream portion of the system) from the portion of the hydraulic system returning fluid to the reservoir from the actuators (the downstream portion of the system). In the event of system pressure loss or controller malfunction, centering enable valve 206 is de-energized and opens when the centering valve 204 is opened to link the two hydraulic circuits. This permits the pressure across the working volumes of the left and right actuators 38 and 39 to equalize and prevents any hydraulic fluid from getting trapped between the hydraulic actuators 38, 39. This prevents hydraulic lock and enables the auxiliary lean control system to lift the bike to the upright condition, in a manner described below.

Referring to FIGS. 9-11 and 13, power cylinder 132 (previously described) is coupled to hydraulic system 200. Specifically, the volume of the first cylinder 156 above the piston 160 is in fluid communication with a hydraulic system 200 and is filled with hydraulic fluid, and the second cylinder 158 (and thus the volume of the first cylinder 156 below the piston 160) is filled with a compressible fluid, such as a pressurized gas.

Various other elements may be incorporated into hydraulic system 200, based on the requirements of a particular design or application. For example, a temperature sensor 210 may be incorporated into either the hydraulic system reservoir 220 or elsewhere in the system. A temperature switch (not shown) may be coupled to the hydraulic system ECU 217 for deactivating the hydraulic system if the hydraulic fluid reaches a critical temperature, to help prevent damage to the system components. Similarly, a level switch (not shown) may be wired into the hydraulic system for deactivating the hydraulic system if the hydraulic fluid level drops to a predetermined level, to help prevent damage to the system components.

In applications where fluid reservoir 220 is exposed to low temperatures, the hydraulic fluid may become too viscous to be drawn into pump 201 without warming. In this case, a thermostatically controlled heater (not shown) may be coupled to the hydraulic system control for warming the fluid to a predetermined temperature prior to activation of the hydraulic system.

A pressure sensor 208 may be coupled to the hydraulic system to detect an excessive system pressure condition. One or more pressure sensors 208 may be operatively coupled to a pressure relief valve (not shown) to automatically actuate the relief valve when a predetermined system pressure is exceeded. Alternatively, the pressure sensor(s) may be operatively coupled to ECU 217, which provides an activation signal to a relief valve upon detection of the excessive system pressure condition.

A heat exchanger (not shown) may also be incorporated into hydraulic system 200 to enable extraction of excess heat from the hydraulic fluid. The heat exchanger may have a conventional single or multiple-pass configuration designed to cool the hydraulic fluid using water or air, as known in the art. The heat exchanger may be mounted to an exterior portion of the vehicle, or to a portion of the vehicle (for example, a radiator) exposed to an airstream flowing around the vehicle during motion of the vehicle, to maximize convective heat transfer from the device. To reduce exposure of the heat exchanger to high fluid pressures, the heat exchanger may be positioned along the tank return line. A bypass valve or relief valve (not shown) can be utilized to protect the unit from pressure surges. A bypass valve may also be specified based on fluid temperature, enabling the fluid to bypass the heat exchanger until the fluid has reached a predetermined temperature. The bypass valve then closes and fluid is routed through the heat exchanger. If desired, a thermostatically controlled valve may be installed in the hydraulic system to route hydraulic fluid to the heat exchanger if the fluid becomes heated to a predetermined threshold temperature.

Operation of hydraulic system 200 in controlling the primary lean control system will now be discussed with reference to FIGS. 4, 6, and 13.

The pressurized hydraulic fluid supplied to the system 200 by the pump 201 passes through the filter 202 first to remove any contaminants. After passing through the filter 202, hydraulic fluid is supplied to valves PCV1, PCV2, and centering valve 204.

As stated previously, the hydraulic actuators 38, 39 act to control the configuration of the trike 10 during normal vehicle operation. More specifically, when entering a turn, one of the hydraulic actuators 38, 39 extends in length while the other retracts, moving the trike 10 into a leaning position as illustrated in FIG. 4. When the trike 10 is leaving the turn, the hydraulic actuators 38, 39 act to bring the trike 10 back to a vertical orientation as illustrated in FIG. 3.

First, to cause the trike 10 to lean to the right, valves PCV1 and PCV4 are closed while PCV2 and PCV3 are opened. This situation permits the pumping of fluid through PCV2 and into hydraulic actuator chambers 211 and 212. This will cause the left actuator 38 to extend in length while the right actuator 39 retracts. At the same time, fluid from hydraulic actuator chambers 210 and 213 is forced out of the hydraulic actuators 38, 39 by the associated pistons 214, 215. The fluid exiting the chambers 210, 213 is forced through open valve PCV3 and to the reservoir 220.

Valves PCV2 and PCV3 are opened to a degree necessary to pressurize chambers 211 and 212 such that actuator 38 extends and actuator 39 contracts to provide the desired rightward lean angle to a portion of the trike. As PCV2 and PCV3 are proportionally energized, the fluid flow is restricted upstream of PCV2 and PCV3, enabling pistons 214, 215 to be moved to the desired positions within actuators 38, 39, and enabling the forces acting on pistons 214, 215 to be balanced to maintain the pistons in their desired positions. As the current is reduced in valves PCV2 and PCV3, the pressure differential in the hydraulic system is reduced reducing the restriction of fluid flow to reservoir 220 through port T. This allows the lean control system to reduce lean or return the portion of the trike to a centered configuration.

As previously described, a substantially horizontal orientation of the transverse beam 30 is maintained by the influence of the spring dampers 36. The lower control arms 34 are connected to the front wheels 22, 24 through the spindles 44 and to the transverse beam 30 by the spring dampers 36. The front wheels 22, 24, and thus the lower control arms 34, remain substantially parallel to the road during normal operation. The road is generally substantially planar for the width of the trike 10, meaning that as long as both front wheels 22, 24 are in contact with the road, whether cornering or tracking a straight line, the spring dampers 36 will bias the transverse beam 30 to an orientation substantially parallel to the road. The hydraulic actuators 38, 39 connect the frame 16 to the transverse beam 30, and control the lean of the trike 10. As the hydraulic actuators 38, 39 extend, they push the frame 16 away from the transverse beam 30, initiating lean. The biasing force from the spring dampers 36 acting on the transverse beam creates a larger moment about the central pivot 86 than the hydraulic actuators 38, 39, so extension of the hydraulic actuators 38, 39 moves the frame 16 with respect to the beam 30.

In the second condition, causing the trike 10 to lean to the left, valves PCV2 and PCV3 are closed while PCV1 and PCV4 are opened. This situation permits the pumping of fluid through PCV1 and into hydraulic actuator chambers 210 and 213. This will cause the right actuator 39 to extend in length while the left actuator 38 retracts. At the same time, fluid from hydraulic actuator chambers 211 and 212 is forced out of the hydraulic actuators 38, 39 by the associated pistons 214, 215. The fluid exiting the chambers 211, 212 is forced through open valve PCV4 and to the reservoir 220.

Valves PCV1 and PCV4 are opened to a degree necessary to pressurize chambers 210 and 213 such that actuator 39 extends and actuator 38 contracts to provide the desired leftward lean angle to a portion of the trike. As PCV1 and PCV4 are proportionally energized, the fluid flow is restricted upstream of PCV1 and PCV4, enabling pistons 214, 215 to be moved to the desired positions within actuators 38, 39, and enabling the forces acting on pistons 214, 215 to be balanced to maintain the pistons in their desired positions. As the current is reduced in valves PCV1 and PCV4, the pressure differential in the hydraulic system is reduced reducing the restriction of fluid flow to reservoir 220 through port T. This allows the lean control system to reduce lean or return the portion of the trike to a centered configuration.

Using hydraulic actuators 38, 39 as discussed affords some major advantages to trikes. First, since the lean of the trike 10 is controlled by the hydraulic actuators 38, 39, the upper and lower control arms 32, 34, spring dampers 36, and steering components are free to act normally, regardless of the trikes lean. This allows the trike 10 to absorb bumps while tracking an arcuate path in the same manner it would if it were tracking a straight line, making for a consistent suspension action, even while turning.

Operation of hydraulic system 200 when actuating auxiliary lean control system 26 will now be discussed with reference to FIGS. 10, 11, and 13.

Referring to the auxiliary lean control system 26, it is mechanically controlled, and is only operable when the trike 10 needs assistance maintaining an upright position (i.e., when the hydraulic system 200 is no longer able to supply enough pressure to properly utilize the hydraulic actuators 38, 39). Loss of hydraulic system pressure can occur in a number of different ways. When the trike 10 is parked and turned off, the hydraulic pump 201 is no longer applying pressure to the hydraulic system 200, so the hydraulic actuators 38, 39 will not be capable of supporting the trike 10. If the hydraulic system 200 fails in any way (i.e. pump failure, ruptured hose, punctured hydraulic actuator, etc.), pressure will also be lost, even if the vehicle engine is still running and the trike 10 is still operable. Yet another potential failure could occur if the electronic control system for the hydraulic actuators 38, 39 malfunctions. It should be noted that this list of failure modes is not complete and can include other programmed faults, even unrelated to the hydraulic system. Regardless of how hydraulic pressure is lost, the auxiliary lean control system 26 will return the trike 10 to an upright and safe position.

Figure 10:
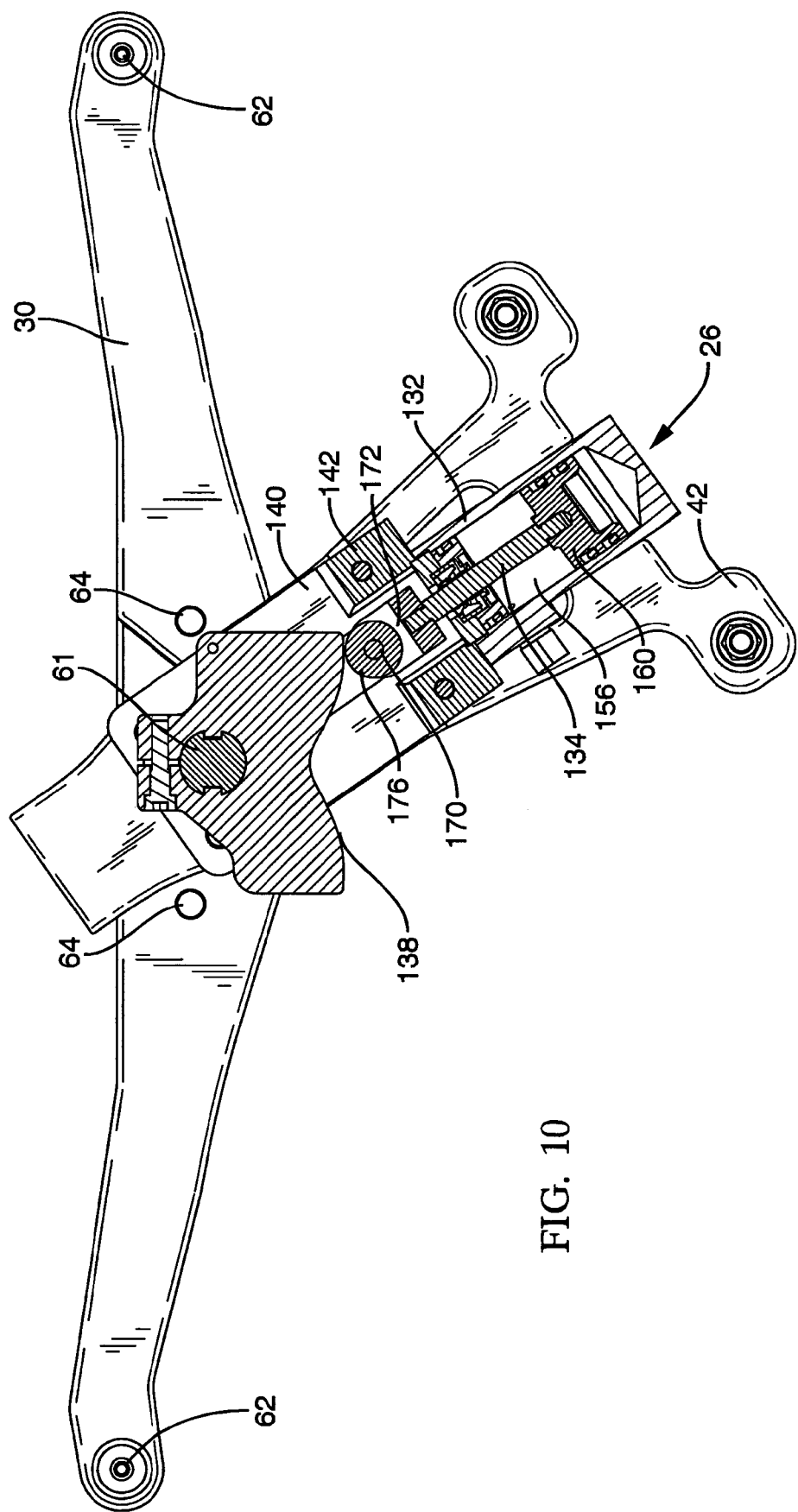
FIG. 10 is a partial cross-sectional view of the auxiliary lean control system of FIG. 9 with the three-wheeled motorcycle in a leaning position.
Figure 11:
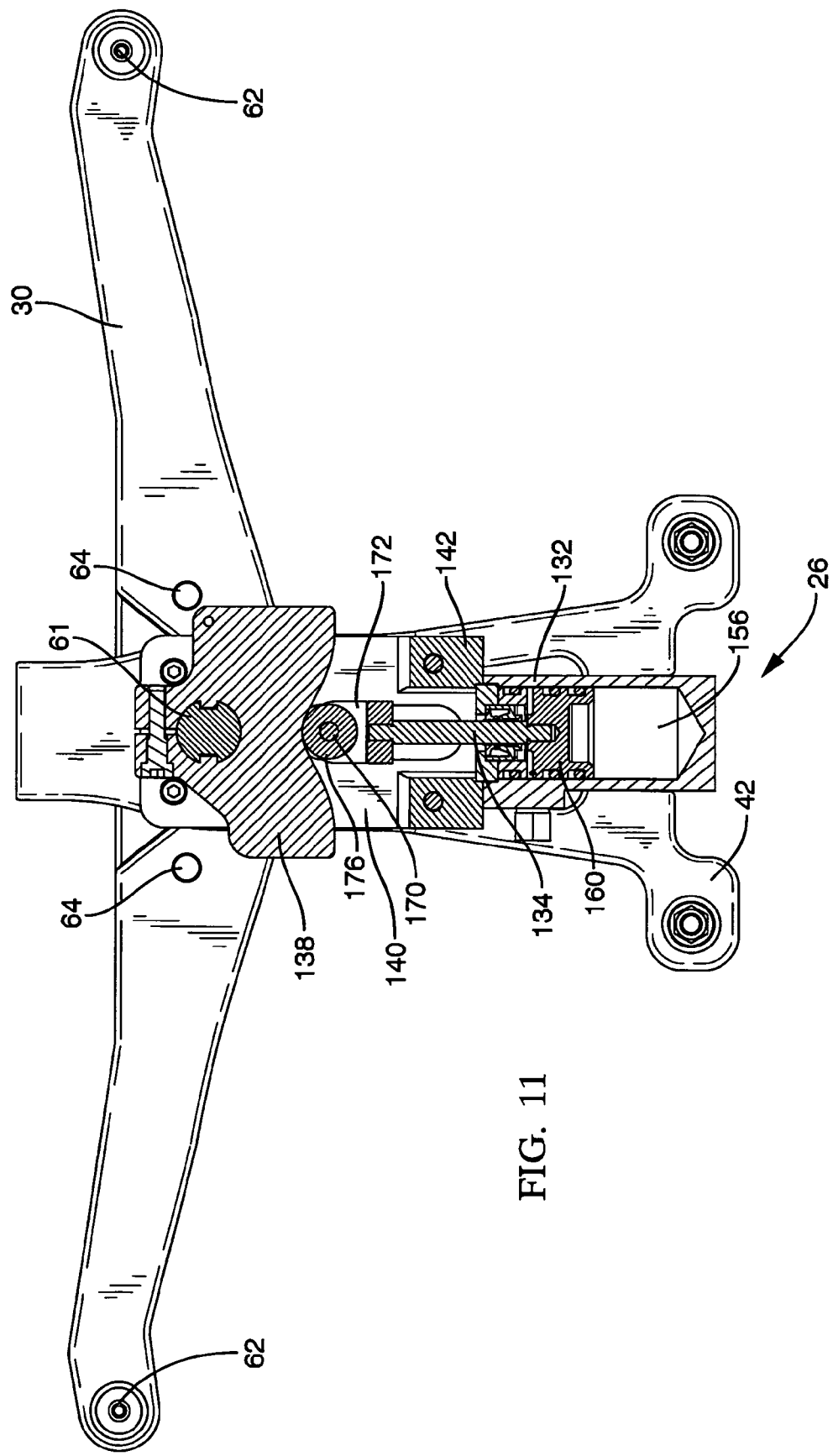
FIG. 11 is a view similar to FIG. 10, with the three-wheeled motorcycle in an upright position.

FIGS. 10 and 11 are section views of the auxiliary lean control system 26 illustrating the trike 10 in a leaning position and an upright position, respectively. Since the transverse beam 30 and the cam 138 are both supported by the keyed shaft 61, they will not rotate with respect to one another. As the trike 10 leans, the transverse beam 30 and the cam 138 remain substantially horizontal. From the perspective of the cam 138, the rest of the trike 10 appears to rotate about the keyed shaft 61. This is illustrated best in FIG. 10, where it is clear that when the trike 10 leans, the auxiliary lean control system 26 appears to rotate about the keyed shaft 61.

As explained above, hydraulic fluid is supplied to centering valve 204. When the primary lean control system is functioning properly, the pressure from the hydraulic fluid in the first cylinder 156 is greater than the pressure of the compressed gas in the second cylinder 158. This forces the piston 160 downward, and disengages the roller assembly 136 from the cam 138, placing the auxiliary lean control system 26 into an unengaged position (FIG. 10). When any of the above mentioned hydraulic system failures occur, pressure is also lost to the first cylinder 156. This allows the compressed gas in the second cylinder 158 to expand and push the piston 160 up, placing the auxiliary lean control system 26 into an engaged position, where the roller assembly 136 is in contact with the cam 138 (FIG. 11). The pressure from the compressed gas is large enough that the center roller 176 pushes on the inner profile of one of the cam lobes 182 with enough force to drive the center roller 176 into the cam recess 180, bringing the trike 10 to an upright position. As long as the hydraulic system is not pressurized, the pressure in the second cylinder 158 will be greater than the pressure in the first cylinder 156. This will keep the center roller 176 engaged with the cam roller recess 180 and will prevent the trike 10 from leaning.

In the event that a failure occurs other than hydraulic system pressure loss, the electronic control unit (ECU) (FIG. 13) controlling the hydraulic system 200 is capable of eliminating hydraulic fluid pumping, and thus hydraulic pressure. This also relieves the pressure in the first cylinder 156, allowing the auxiliary lean control system 26 to function. When the hydraulic system is pressurized again, the pressure in the first cylinder 156 will again be greater than the pressure in the second cylinder 158. This forces the piston 160 downward, disengaging the roller assembly 136 from the cam 138 and allowing the bike 10 to function normally.

The embodiment just described is adapted for bringing a portion of the trike to a lean angle of approximately zero degrees (corresponding to an upright position) when the trike resides on a substantially level road surface. In this case, piston 160 forces roller assembly 136 to rollingly engage the contoured surface of cam 138 until the roller assembly is centered along the contoured surface of the cam. The rollers become nested and locked within the grove formed in the cam surface when a lean angle of approximately zero degrees is achieved. Pressure applied by piston 160 holds the rollers in place, which locks the auxiliary lean control system in the zero-degree lean angle configuration and prevents the vehicle from leaning away from this position, thereby providing an upright vehicle configuration having a relatively low potential energy.

Figure 12:
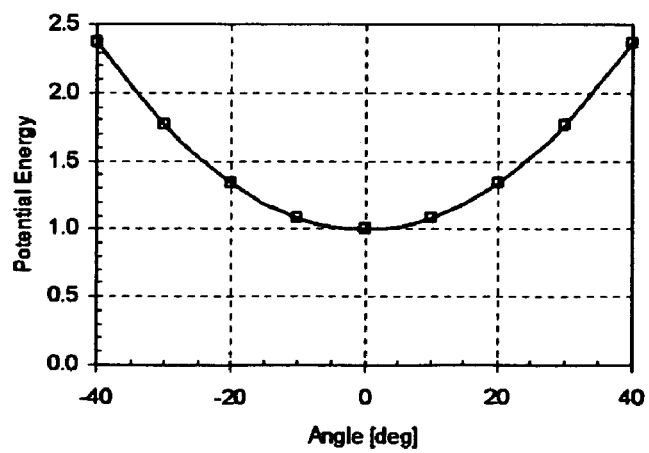
FIG. 12 shows a resultant potential energy function derived by applying the energy stored in the auxiliary lean control system shown in FIG. 9 to the vehicle system, effectively combining the potential energy function shown in FIG. 8 with the potential energy function shown in FIG. 7.

FIG. 12 shows a resultant potential energy function derived by applying the energy stored in the second lean control system to bring the vehicle body to an upright configuration in which the lean angle to approximately zero (on a substantially level road surface), effectively combining the potential energy function shown in FIG. 7 with the potential energy function shown in FIG. 8. In addition, when the vehicle body is brought to an upright position, the vehicle body is locked in the upright position by the auxiliary lean control system to prevent the vehicle body from leaning in either lateral direction while the first lean control system is non-functioning and while the second lean control system is engaged. It may be seen from FIG. 3 that the upright configuration of the vehicle with the leaning suspension system locked in a zero or near-zero lean angle configuration is a relatively stable configuration of the vehicle, since a non-zero vehicle lean angle may only be achieved by tilting or rolling the entire vehicle, thereby creating a vehicle configuration at a state of relatively higher potential energy than that provided by the upright, zero lean-angle configuration.

The shape of the auxiliary system potential function of FIG. 8 may be controlled by a combination of energy storage device internal pressure and system mechanics (cam dimensions, etc.). The optimum shape of the function will be determined by factors such as the configuration of the vehicle upon deactivation or malfunction of the primary lean control system, and the desired final configuration of the vehicle. A potential function representing the final vehicle configuration (and combining the potential functions shown in FIGS. 7 and 8) is shown in FIG. 12. The shape of the combined function in any particular application will be determined by the desired final configuration of the vehicle.

If a failure occurs other than hydraulic system pressure loss, the ECU 217 is capable of eliminating hydraulic fluid pumping, and thus hydraulic pressure. This also relieves the pressure in the first cylinder 156, allowing the auxiliary lean control system 26 to function. When the hydraulic system 200 is pressurized again, the pressure in the first cylinder 156 will again be greater than the pressure in the second cylinder 158. This forces the piston 160 downward, disengaging the roller assembly 136 from the cam 138 and allowing the trike 10 to function normally.

Referring again to FIG. 13, a hydraulic system failure may occur in which hydraulic fluid is trapped in the hydraulic lines between either hydraulic actuator chambers 210 and 213, or in the hydraulic lines between chambers 211 and 212. This could occur if, for example, the ECU 217 malfunctions and doesn't allow valves PCV3 or PCV4 to open. If this occurs, the hydraulic actuators 38, 39 may become locked in whatever their current state is, thereby possibly locking the trike in a leaning position. This would prevent the auxiliary lean control system 26 from operating, as the auxiliary lean control system is incapable of exerting enough force to overcome the force exerted on the transverse beam 30 by the trapped hydraulic fluid. To remedy this situation, the centering enable valve 206 is opened when the centering valve 204 is opened. This allows hydraulic fluid to flow between any of the hydraulic actuator chambers 210-213 and prevents any hydraulic fluid from getting trapped between the hydraulic actuators 38, 39.

From the above description, it may be seen that the hydraulic system of the present invention includes a plurality of actuators for combining to provide a selected configuration of a vehicle, wherein the selected configuration of the vehicle comprises either a first configuration of a plurality of first configurations or a second configuration of a plurality of second configurations. In the embodiment described above, the selected configuration of the vehicle defines a lean angle of at least a portion of the vehicle. The hydraulic system also includes a first hydraulic circuit adapted for energizing the plurality of actuators to produce a first configuration of the plurality of first configurations of the vehicle when the first hydraulic circuit is activated. The hydraulic system also includes a second hydraulic circuit adapted for energizing the plurality of actuators to produce a second configuration of the plurality of second configurations of the vehicle when the second hydraulic circuit is activated.

The first hydraulic circuit includes the hydraulic lines, valves, etc. defining a flow path of the hydraulic fluid required to cause the actuators to operate so as to lean the vehicle to the right. Similarly, the second hydraulic circuit includes the hydraulic lines, valves, etc. defining a flow path of the hydraulic fluid required to cause the actuators to operate so as to lean the vehicle to the left. As the first and second hydraulic circuits are never both activated simultaneously, portions of the hydraulic system may be common to both the first and second hydraulic circuits. In alternative embodiments (not shown), the first and second hydraulic circuit may be constructed so as to incorporate no common elements.

A control system (in the embodiment described above, ECU 217) is operatively coupled to both the first hydraulic circuit and the second hydraulic circuit for selectively activating one of the first hydraulic circuit and the second hydraulic circuit to provide, responsive to at least one input to the control system, one of a respective first configuration of the plurality of first configurations of the vehicle or one of a respective second configuration of the plurality of second configurations of the vehicle, wherein the first configuration of the second configuration provided by the actuators corresponds to the selected configuration of the vehicle.

Figure 14:
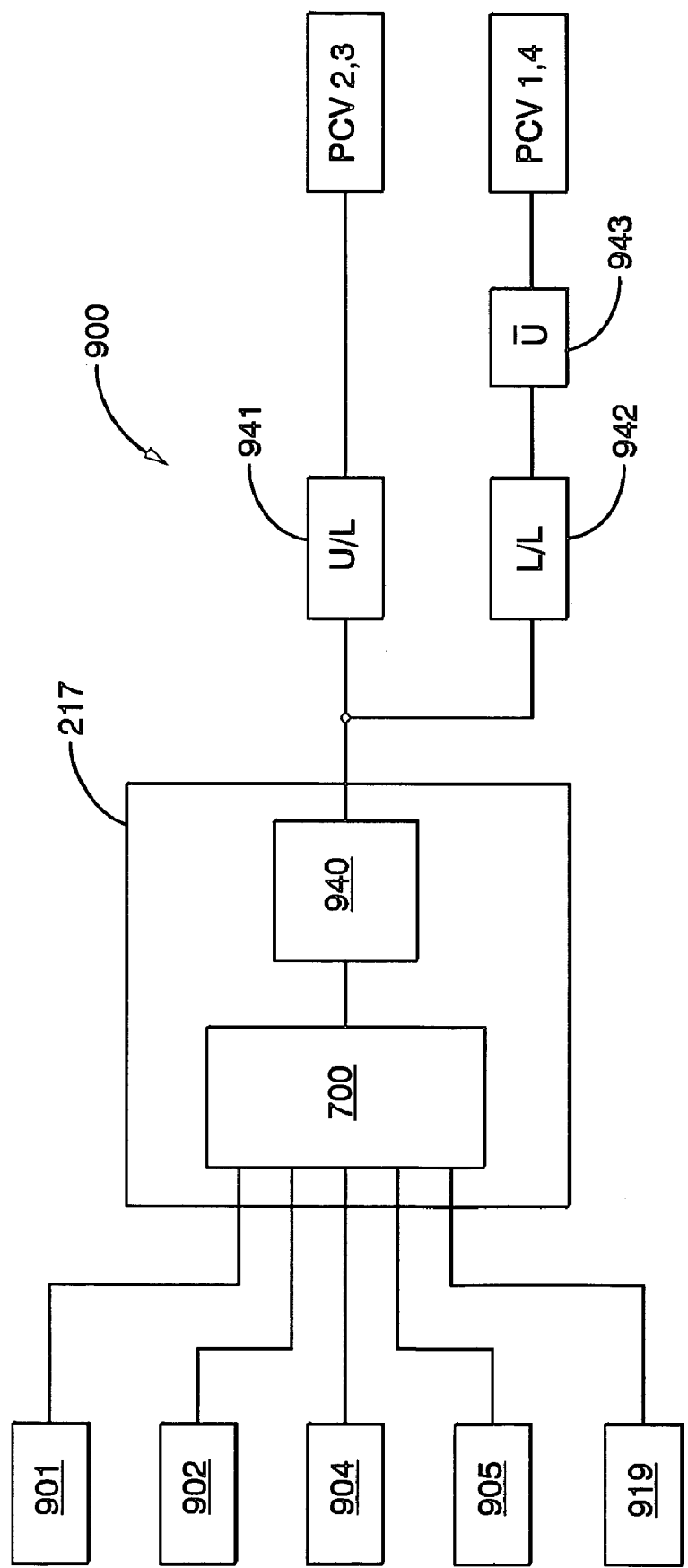
FIG. 14 is a schematic diagram of one embodiment of a control system for controlling the hydraulic system for actuating the primary and auxiliary lean control systems of the three-wheeled motorcycle of FIG. 1.

FIGS. 14-19 show one embodiment of a control system, generally designated 900, provided for controlling actuation of valves PCV1-PCV4 responsive to the current dynamic conditions of the trike. Referring specifically to FIG. 14, the basic elements of control system 900 include ECU 217 and a plurality of sensors coupled to control unit 217. In a particular embodiment, ECU 217 includes a signal processing circuit 700 and a valve driver circuit 940. In the embodiment shown in FIGS. 14-19, a pair of limiting circuits 941, 942 is coupled to driver circuit 940, and an inverter circuit 943 is coupled to limiting circuit 942.

In one embodiment, the plurality of sensors includes at least a steering position or steering angle sensor 901, a lateral angular rate sensor or lateral accelerometer 905, a lean position sensor 904, a vehicle road speed sensor 902, and a steering angle rate sensor 919. Additional sensors may be operatively coupled to ECU 217 if desired, depending on the requirements of a particular application. For example, such elements as a fluid pressure sensor (not shown), a fluid level sensor (not shown), a fluid temperature sensor (such as sensor 250 in FIG. 13), and an occupant or rider seat sensor (not shown) may be coupled to ECU 217 to provide inputs thereto.

Signal processing circuit 700 receives inputs from the various sensors and, in response thereto, provides an input signal to valve driver circuit 940 indicative of a desired configuration of the vehicle based on measurements of the sensors. In response to the signal from processing circuit 700, driver circuit 940 provides a pulse-width-modulated, solenoid control signal for actuating the valve network PCV1-PCV4 to impart a desired lean angle to a portion of the trike, as described herein.

While the embodiment of the control system described herein is directed to controlling electrically actuatable solenoid valves used in a hydraulic system, the system of the present invention may be used to control a variety of other electrically actuatable elements, in any of a variety of electrical or electro-mechanical systems.

Figure 15:
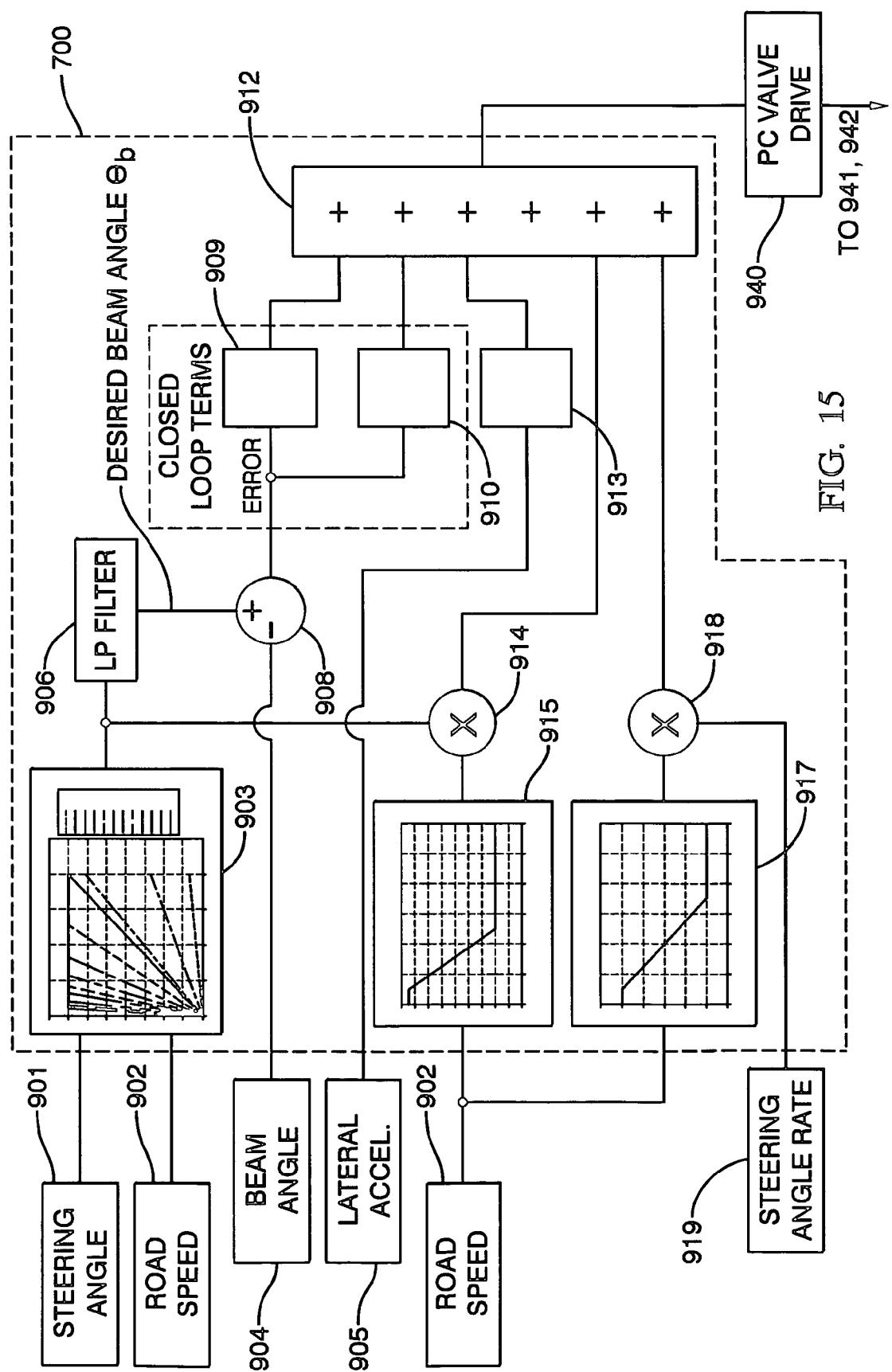
FIG. 15 is a portion of the schematic diagram of FIG. 14 showing, in greater detail, one embodiment of an electronic control unit (ECU) suitable for use in the control system of FIG. 14.

Referring to FIGS. 14 and 15, a steering position sensor or steering angle sensor 901 (for example, an indicated position type rotational sensor) is coupled to the trike steering mechanism and to ECU 217 for measuring an angular orientation of an element of the vehicle steering system. In one embodiment, steering angle sensor 901 provides an output voltage signal indicating rotational position of the trike handlebars relative to a predetermined reference position of the handlebars.

In the embodiment shown in FIGS. 14 and 15, the steering position sensor output comprises a voltage signal which varies between a maximum positive value when the handlebars are fully rotated in a first direction (for example, full right), and a maximum negative value when the handlebars are fully rotated in the opposite direction (full left). When the handlebars are oriented so as to point the trike substantially straight ahead, the steering position sensor output voltage is at or about zero. The magnitude of the output voltage varies linearly between the maximum positive and maximum negative values as the handlebars are rotated between their rotational limits. Thus, the polarity of the output voltage serves as an indicator of steering direction and, therefore, the desired lean direction. One example of a steering angle sensor adaptable for use in the control system of the present invention is disclosed in U.S. Pat. No. 6,498,971, incorporated herein by reference. Other known types or designs of steering angle sensors are also suitable.

Road speed sensor 902 measures a parameter indicative of vehicle road speed. As used herein, the term "parameter" refers to one of a set of measurable factors that define a system and describe its behavior. In one embodiment of the control system, road speed sensor 902 comprises a wheel speed sensor which measures a value indicative of vehicle wheel speed. This vehicle wheel speed value may be processed to derive a value indicative of vehicle road speed. The measured wheel speed value may be processed by a circuit (for example, a microprocessor) embedded in sensor 902, or a signal indicative of vehicle wheel speed may be conveyed from sensor 902 to another circuit separate from sensor 902 for processing. A processed signal indicating vehicle speed is then sent to value generating circuits 903, 915, and 917 (described in greater detail below).

One example of a wheel speed sensor suitable for use in the control system of the present invention is disclosed in U.S. Pat. No. 6,774,622, incorporated herein by reference. Other types of road speed sensors are also contemplated. Alternatively, value generating circuits 903, 915, and 917 may be programmed or designed to receive as input a wheel speed value signal, rather than a vehicle speed value signal. Value generating circuits 903, 915, and 917 may be programmed or configured to accept any of a variety of input signals indicative of road speed (or signals from which a road speed value may be derived), depending on the type of road speed sensor intended to be used for a particular application.

Referring to FIG. 15, a lean position sensor 904 is coupled to a summing junction 908 of ECU 217 to provide an output thereto indicative of the lean angle of the leaning portion of the trike. In the embodiment of the control system described herein, the actual lean angle of the leaning portion of the trike is not measured. Instead, referring to FIG. 4, a beam angle $\theta_A$ is measured using, for example, a rotational sensor. Referring to FIG. 4, beam angle $\theta_A$ is defined as the angle between a first line L1 extending between center pivot point 60 of transverse beam 30 and one of end pivot points 62 of beam 30, and a second line L2 extending through center pivot point 60 and substantially bisecting the portion of the leaning portion of the trike. When the body of the trike is in a no-lean condition (i.e., with a lean angle of substantially zero degrees), line L2 is substantially vertical.

Although the actual lean angle of the trike is not measured in the embodiment shown, the lean angle could be measured and input into ECU 217 in an alternative embodiment of the control system.

Referring again to FIGS. 14 and 15, a lateral accelerometer 905 provides a signal indicative of the lateral acceleration of the vehicle during a turn.

Steering angle rate sensor 919 measures a rate of change of the angular orientation of an element (such as the trike handlebars) of the vehicle steering system. In the embodiment shown in FIGS. 14-19, steering angle rate sensor 919 measures the rate of rotation of the trike handlebars. The steering angle rate may be obtained, for example, by measuring the steering angle of the handlebars and differentiating the result using a differentiator (not shown).

FIG. 15 shows a schematic diagram of one embodiment of ECU 217. ECU 217 includes a signal processing circuit, generally designated 700, coupled to the sensors for determining a desired energization of the valves dependent upon measurements by at least a portion of the sensors. ECU 217 also includes a driver circuit 940 coupled to signal processing circuit 700 for generating, responsive to the desired energization of the valves as determined by the signal processing circuit, a control signal to energize the valves to the desired energization. Alternatively, driver circuit 940 may be separate from ECU 217.

In the embodiment shown in FIG. 15, one or more A/D conversion circuits (not shown) may be incorporated into ECU 217 to perform A/D conversion of analog signals prior to input of the signals into associated circuit elements requiring digital signals. Alternatively, the A/D conversion may be performed externally of ECU 217 prior to receipt of the input signal by an element of the ECU. The analog signals received from the various sensors are passed through appropriate filtering circuits (not shown) and then sampled by the A/D converters. Depending on the intended use of the signals, they may be conditioned further to aid in preventing false diagnostic triggers. This further conditioning could entail, for example, digitally adding delays or hysteresis to the signal using suitable software or hardware means prior to further processing of the signal within ECU 217. Signals acquiring a noise or interference component due to interaction with circuit elements or from other sources may require filtering as well. Discrete inputs, where the signal may represent an asserted or deasserted condition, are normally delayed to avoid false readings. For example, a signal from a fluid level sensor is generally time-filtered to avoid a low fluid level reading due to fluid agitation during abrupt vehicle maneuvers. In this instance, the fluid level is not low; however, if the signal is not filtered, the sensor may send a false positive momentarily as the fluid is 'splashing' about the hydraulic fluid reservoir.

Referring to FIGS. 4 and 15, a value generating circuit 903 receives as input a signal indicative of vehicle road speed from road speed sensor 902, and a signal indicative of steering angle from steering position sensor 901. The output of value generating circuit 903 is a signal representing a desired beam angle $\theta_D$. The desired beam angle is the beam angle $\theta_D$ deemed most suitable for optimizing vehicle dynamic stability under the current conditions of the vehicle (for example, at the current vehicle speed, steering angle, lateral vehicle acceleration, etc.) Value generating circuit 903 is programmed or designed to derive the desired beam angle using the designated inputs. In other embodiments of the control system, alternative or additional inputs may be used in deriving the desired beam angle $\theta_D$.

Figure 17:
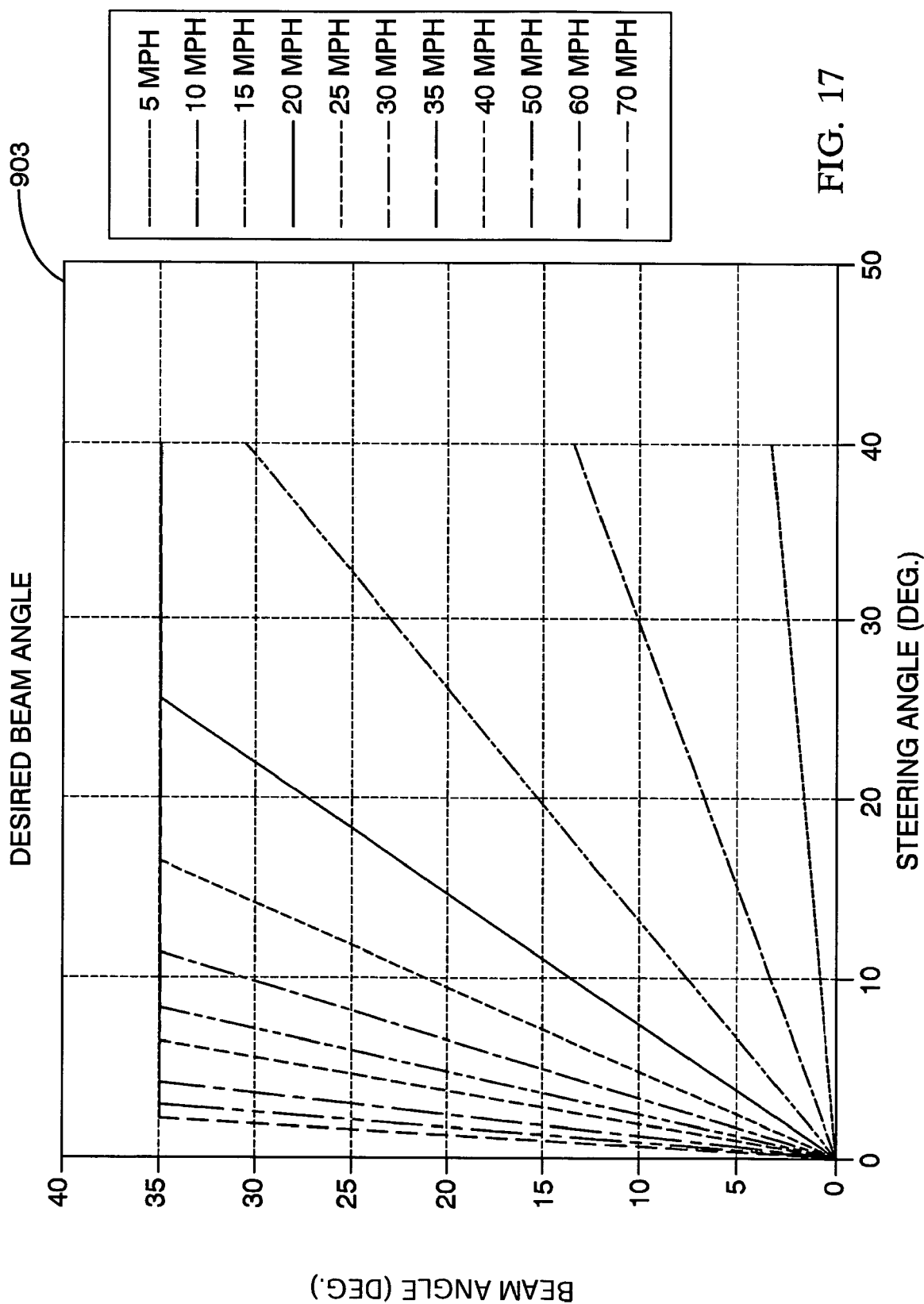
FIG. 17 is a functional schematic view of a first value generating circuit in accordance with the present invention showing one embodiment of the functional relationships between desired beam angle, vehicle road speed, and steering angle that may be incorporated into an ECU of the present invention.

FIG. 17 shows one example of the type of functional relationships between desired beam angle $\theta_D$, vehicle road speed, and steering angle that may be programmed or otherwise incorporated into value generating circuit 903. For the steering and control of the trike to have the same "feel" to a rider that a two-wheeled motorcycle has, it is desirable to configure the control system such that, as vehicle speed increases, less handlebar rotation is needed for the control system to generate a given desired beam angle in the trike. This control scheme is reflected in the plots of FIG. 17. For example, referring to the drawing, at a road speed of approximately 15 mph, a steering angle of approximately 20° is needed for the control system to generate a desired beam angle of 15°, while at a road speed of approximately 25 mph, a steering angle of approximately 8° is needed for the control system to generate the desired beam angle of 15°.

In one embodiment, value generating circuit 903 includes a microprocessor which is programmed with a software program, or which stores or has access to one or more mathematical functions, curves, or look-up tables which provide values of desired beam angle as a function of steering angle and road speed. The actual beam angle is measured by sensor 904 which provides, to a subtractor circuit 908, a signal corresponding to the actual beam angle.

To determine the desired beam angle $\theta_D$ for road speed values falling between the values for which curves are supplied as shown in FIG. 17, methods such as interpolation may be used to derive values of the desired beam angle $\theta_D$. The interpolation or other method of determining desired beam angle $\theta_D$ may be embodied, for example, in a circuit or a software routine.

Referring again to FIG. 15, to aid in "smoothing out" the generated control signal, thereby improving steady-state stability of the hydraulic system, the output of value generating circuit 903 is filtered in a low-pass filter 906.

The output of low-pass filter 906 (representing the desired beam angle $\theta_D$) is sent to summing junction 908. The output from lean position sensor 904 (representing the actual beam angle $\theta$) is also input to summing junction 908, which is coupled to the output of low pass filter 906 and to the output of lean position sensor 904.

An error term representing the difference between the desired beam angle $\theta_D$ and the actual beam angle $\theta_A$ is calculated in summing junction 908 by subtracting the output from lean position sensor 904 from the output of low-pass filter 906. This error term is used to derive signal components enabling a degree of closed loop control of the hydraulic actuators.

Referring again to FIG. 15, the output of summing junction 908 is sent to a plurality of amplifier elements 909, 910. Element 909 is uses a software routine to apply a tunable gain to the output of summing junction 908. Alternatively, an amplifier circuit (hardware) may be employed to apply a tunable gain to the signal. The tunable gain permits the error between the actual beam angle $\theta_A$ and the desired beam angle $\theta_D$ to be given a relatively greater or lesser weight in generation of the valve driver signal.

Element 910 applies another tunable gain to the output of summing junction 908. The applied gain in 910 is inversely proportional to the vehicle road speed. Thus, the rate of change of the output of element 910 will be proportional to the magnitude of the input error term. When the error term is substantially zero, the rate of change of the output of circuit 910 will also be substantially zero; thus, the output value of circuit 910 will be essentially constant. The outputs of circuits 909 and 910 are combined in summation junction or adder 912. Amplifier elements 909, 910 process the error term provided by summing junction 908 to generate outputs enabling a degree of closed loop control of the hydraulic actuators. That is, elements 909 and 910 provide signals representing the difference between the actual and desired vales of the beam angle, which are used in generation of the pulse width modulated control signal that is sent to the valve system.

Referring again to FIG. 15, outputs from the various elements of ECU 217 are combined in adder 912 to generate an output signal forwarded to valve driver circuit 940 for use in generating the pulse width modulated valve control signal.

A number of open-loop control outputs are also provided for use in generating the valve control signals. Referring to FIG. 15, these output signals are provided by amplifier element 913, multiplier circuit 914, and multiplier circuit 918. These outputs aid in generating control signals which actuate valves PCV1-PCV4 enabling smooth control of the trike by the rider, and providing control and responsiveness similar to that experienced when riding a conventional motorcycle.

Output from lateral accelerometer 905 is passed through a filter 3 Hz filter (not shown) to filter out noise components of the signal. The signal is then passed to amplifier element 913. Element 913 is provides a tunable gain to an output signal received from lateral accelerometer 905. This allows the lateral accelerometer reading to be given a relatively greater or lesser weight in generation of the valve driver signal. In addition, during turning, the trike may be subject to a net lean torque which could either decrease or increase actual lean angle $\theta_A$. Input from lateral accelerometer 905 allows generation of a signal (by element 913) which compensates for the net lean torque, thereby reducing the amplitudes of the output signals from 909 and 910 required to achieve the desired beam angle. The output of amplifier element 913 is sent to adder circuit 912 for use in generating a signal to valve driver circuit 940.

Figure 18:
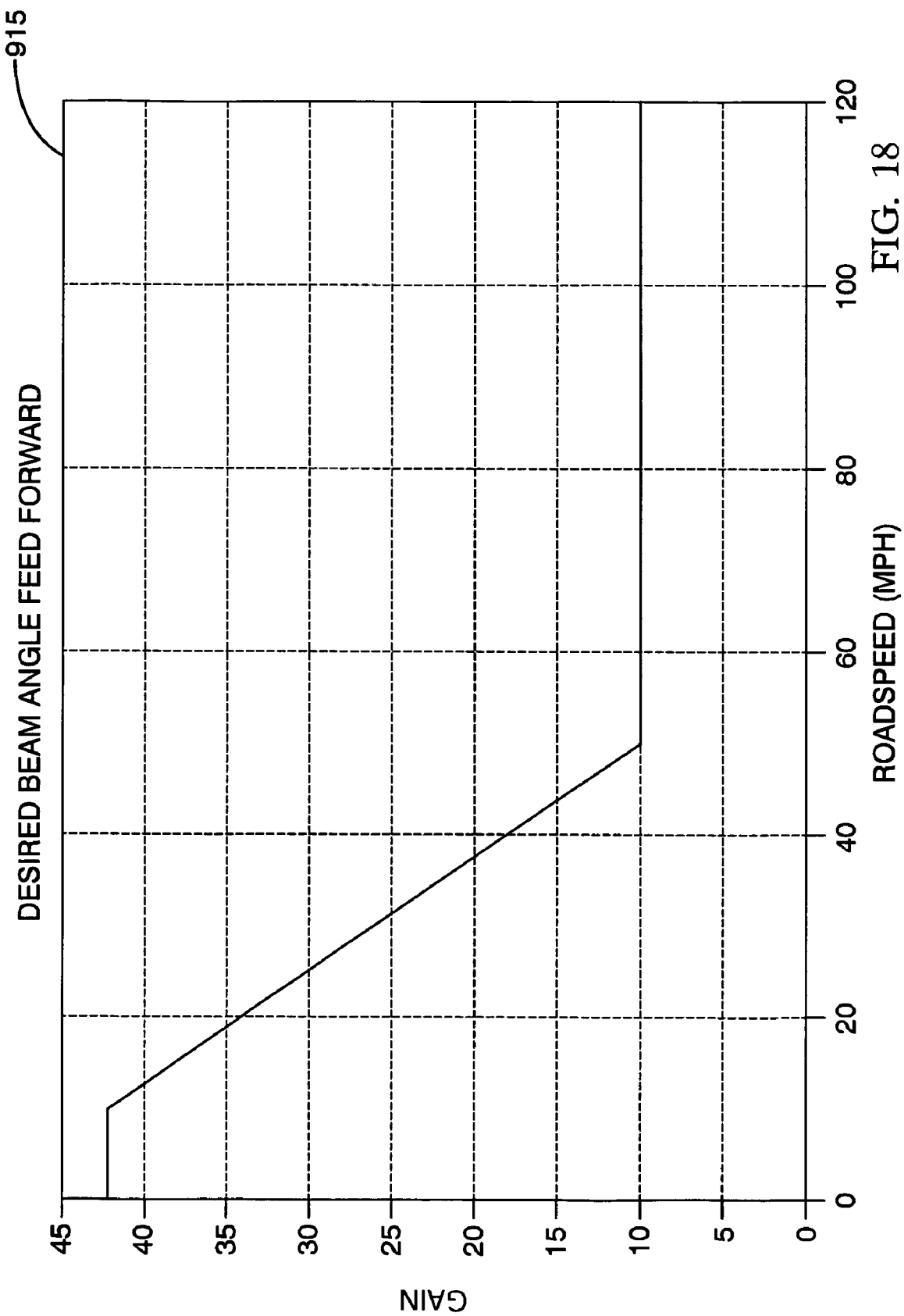
FIG. 18 is a functional schematic view of a second value generating circuit in accordance with the present invention showing one embodiment of a first set of functional relationships between gain and vehicle road speed that may be incorporated into an ECU of the present invention.

Referring to FIGS. 15 and 18, another value generating circuit 915 receives as input a signal indicative of vehicle road speed from road speed sensor 902. Value generator circuit 915 generates an output comprising a feedforward gain that is combined (in multiplier circuit 914) with desired beam angle $\theta_D$ to provide the feedforward gain to the desired beam angle $\theta_D$ as a function of vehicle road speed. The gain is relatively high when the vehicle speed is low, and the gain decreases as vehicle speed increases. Application of this gain allows smoother vehicle lean angle or beam angle transitions at higher vehicle speeds, and more responsive lean angle or beam angle transitions at lower speeds.

In one embodiment, value generating circuit 915 includes a microprocessor which is programmed with a software program, or which stores or has access to one or more mathematical functions, curves, or look-up tables which provide values of gain as a function of road speed. FIG. 18 shows one example of the type of functional relationships between gain and vehicle road speed that may be programmed or otherwise incorporated into value generating circuit 915.

Referring again to FIG. 15, a signal representing desired beam angle and the output of second value generator circuit 915 are sent to a multiplier circuit 914. The output of multiplier circuit 914 is sent to adder circuit 912 for use in generating a signal to valve driver circuit 940. This operation improves responsiveness and dynamic feel of the trike while also providing control stability by reducing the amplitudes of the closed loop output signals from 909 and 910 required to achieve the desired beam angle.

Figure 19:
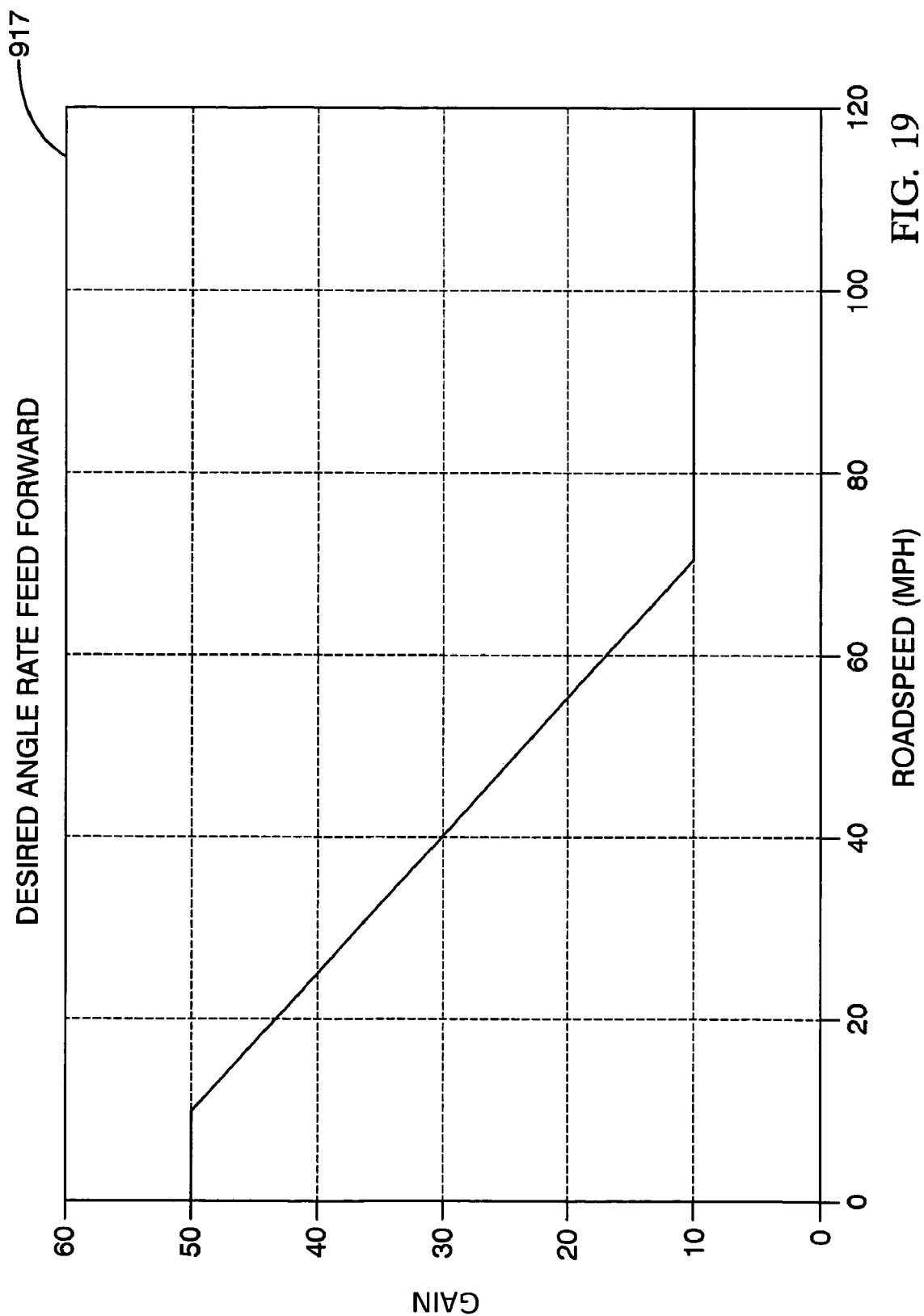
FIG. 19 is a functional schematic view of a third value generating circuit in accordance with the present invention showing one embodiment of a second set of functional relationships between gain and vehicle road speed that may be incorporated into an ECU of the present invention.

Referring to FIGS. 15 and 19, another value generating circuit 917 receives as input a signal indicative of vehicle road speed signal from road speed sensor 902. Value generator circuit 917 provides a feedforward gain to the steering angle rate sensor output signal when the vehicle speed is low and decreases as speed increases. This gain is a function of the vehicle road speed, and provides a reduction in the relative weight of the steering angle rate term in generation of the valve drive signal as the vehicle speed increases.

FIG. 19 shows one example of the type of functional relationships between gain and vehicle road speed that may be programmed or otherwise incorporated into value generating circuit 917. In one embodiment, value generating circuit 917 includes a microprocessor which is programmed with a software program, or which stores or has access to one or more mathematical functions, curves, or look-up tables which provide values of gain as a function of vehicle road speed. The output of multiplier circuit 913 is sent to adder circuit 912 for use in generating a signal to valve driver circuit 940.

Referring again to FIG. 15, a signal representing steering angle rate and the output of value generator circuit 917 are sent to a multiplier circuit 918. A turning moment exerted on the trike handlebar will result in a lean torque which is opposite in sign or direction of the desired lean angle $\theta_D$. This torque may be compensated for by multiplying the output of steering angle rate sensor 919 by the output of value generating circuit 917 in multiplier 918. The output of multiplier circuit 918 is sent to adder circuit 912 for use in generating a signal to valve driver circuit 940. The resulting sum of the previously described closed loop and open loop inputs to adder circuit 912 enable the generation of a control signal by driver circuit 912 that results in a fast, stable, and smooth response of the trike to dynamic conditions and inputs from the rider.

Value generating circuits 903, 915, and 917 may be programmed or configured to accept any of a variety of input signals indicative of road speed (or from which a road speed value may be derived), depending on the type of road speed sensor intended to be used for a particular application.

Figure 16:
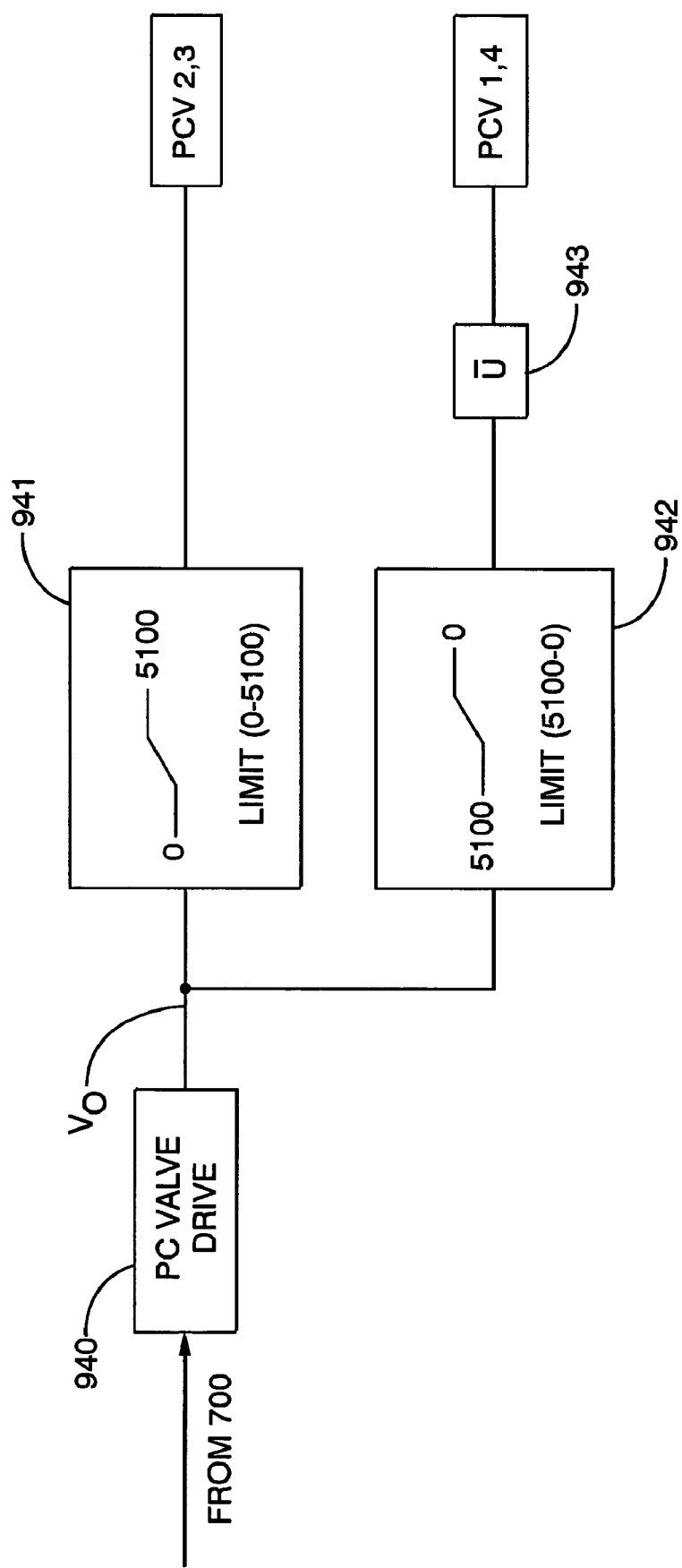
FIG. 16 is a continuation of the schematic diagram of FIG. 15.

Referring to FIGS. 15 and 16, the voltage $V_O$ of the driver circuit output has a polarity indicative of the desired lean direction (left or right) of a portion of the vehicle. The voltage polarity thus indicates which pair of proportional control valves is to be energized. In the embodiment shown in FIGS. 14-19, positive values of $V_O$ are provided to PCV2 and PCV3 for generating corresponding rightward lean angles, and negative values of $V_O$ are provided to PCV1 and PCV4 for providing corresponding leftward lean angles. In addition, output voltage $V_O$ has a magnitude representative of the valve energization level required to provide the desired lean angle.

Any one of various vehicle sensor readings may provide an indicator used to determine the polarity to be assigned to the output of driver circuit 940. For example, information provided by steering position sensor 901, lateral accelerometer 905, or lean position sensor 904 may be used. Alternatively, information from any other sensor or device may be used as long as the information can be provided to ECU 217 in a form that indicates the lean direction to be imparted to the vehicle.

Referring to FIG. 16, the driver circuit output is routed through one of upper limiting circuit 941 or lower limiting circuit 942 based on the polarity of the driver circuit output voltage $V_O$. As is known in the art, limiter circuits 941, 942 restrict the amplitude of an input voltage applied thereto such that the amplitude falls within predefined minimum and maximum values. In the embodiment shown in FIGS. 14-19, limiting circuit 941 limits output voltage $V_O$ to an amplitude within a predefined range of positive values, while limiting circuit 942 limits output voltage $V_O$ to an amplitude within a predefined range of negative values.

Also, in the embodiment shown in FIGS. 14-19, signals having positive output voltage $V_O$ values are transmitted through upper limiting circuit 941 to proportionately energize PCV2 and PCV3. Upper limiting circuit 941 is configured to block signals having negative output voltage $V_O$ values. As explained previously, these negative-polarity signals indicate that PCV1 and PCV 4 are to be energized. These signals are conveyed to lower limiting circuit 942 and, after voltage limiting therein, are passed through an inverter circuit 942, so that an inverted voltage signal is provided at the output of the inverter circuit. This output signal is conveyed to PVC1 and PCV4 to proportionately energize the valves.

As stated previously, additional sensors may be coupled to ECU 217 to provide additional inputs thereto, these inputs being usable in generation or modification of the output of ECU 217, which is used by driver circuit 940 to generate the valve system control signal.

Unless otherwise noted, elements of the vehicle lean control systems and hydraulic system described herein may be fabricated and interconnected using methods known in the art. It will also be understood that the foregoing descriptions of embodiments of the present invention are for illustrative purposes only. As such, the various structural and operational features herein disclosed are susceptible to a number of modifications commensurate with the abilities of one of ordinary skill in the art, none of which departs from the scope of the present invention as defined in the appended claims.

What is claimed is:

1. A control system for controlling energization of a plurality of valves in a hydraulic system, the control system comprising:

a plurality of sensors;

a signal processing circuit coupled to the plurality of sensors for determining a desired energization of the plurality of valves dependent upon measurements by at least a portion of the plurality of sensors; and a driver circuit coupled to the signal processing circuit for generating, responsive to the desired energization of the plurality of valves as determined by the signal processing circuit, a control signal to energize the plurality of valves to the desired energization, wherein the plurality of sensors includes;

a steering angle sensor for measuring a parameter indicative of an angular orientation of a vehicle steering mechanism;

a road speed sensor for measuring a parameter indicative of vehicle road speed;

a lean position sensor for measuring a parameter indicative of a lean angle of at least a portion of the vehicle;

and wherein the signal processing circuit includes;

a value generating circuit configured to process an output of the steering angle sensor and an output of the road speed sensor, to provide an output indicative of a desired lean angle of the at least a portion of the vehicle;

a filter configured to process an output of the value generating circuit;

a first summing junction configured to process an output of the filter and an output of the least position sensor, to provide an output comprising a difference between the output of the filter and the output of the lean position sensor;

an amplifier element configured to process the output of the first summing junction, to provide a tunable gain to the output of the first summing junction; and a second summing junction configured to sum an output of the amplifier element and an output of at least one other element to provide a summing junction output for use in generating the control signal to energize the plurality of valves.

2. A control system for controlling energization of a plurality of valves in a hydraulic system incorporated into a vehicle, the control system comprising:

a plurality of sensors including a steering angle sensor for measuring a parameter indicative of an angular orientation of an element of a vehicle steering system, a road speed sensor for measuring a parameter indicative of vehicle road speed, a lean position sensor for measuring a parameter indicative of a lean angle of at least a portion of the vehicle, a lateral accelerometer for measuring a parameter indicative of a lateral acceleration of the vehicle during turning of the vehicle, and a steering angle rate sensor for measuring a rate of change the angular orientation of the element of the vehicle steering system;

a signal processing circuit coupled to the plurality of sensors for determining a desired energization of the plurality of valves dependent upon measurements by at least portion of the plurality of sensors; and
a driver circuit coupled to the signal processing circuit for generating, responsive to the desired energization of the plurality of valves as determined by the signal processing circuit, a control signal to energize the plurality of valves to the desired energization.

3. A vehicle including a control system in accordance with claim 2.

4. A vehicle including a control system in accordance with claim 1.

5. A control system for controlling energization of a plurality of valves in a hydraulic system, the control system comprising:
a plurality of sensors;
a signal processing circuit coupled to the plurality of sensors for determining a desired energization of the plurality of valves dependent upon measurements by at least a portion of the plurality of sensors; and
a driver circuit coupled to the signal processing circuit for generating, responsive to the desired energization of the plurality of valves as determined by the signal processing circuit, a control signal to energize the plurality of valves to the desired energization, wherein the plurality of sensors includes a lateral accelerometer for measuring a parameter indicative of a lateral acceleration of the vehicle;
and wherein the signal processing circuit includes an amplifier element configured to process an output of the lateral accelerometer, to provide a tunable gain to the output of the lateral accelerometer; and
a summing junction configured to sum an output of the amplifier element and an output of at least one other element, to provide a summing junction output for use in generating the control signal to energize the plurality of valves.

6. A vehicle including a control system in accordance wit claim 5.

7. A control system for controlling energization of a plurality of valves in a hydraulic system, the control system comprising:
a plurality of sensors;
a signal processing circuit coupled to the plurality for sensors for determining a desired energization of the plurality of valves dependent upon measurements by at least a portion of the plurality of sensors; and
a driver circuit coupled to the signal processing circuit for generating, responsive to the desired energization of the plurality of valves as determined by the signal processing circuit, a control signal to energize the plurality of valves to the desired energization, wherein the plurality of sensors includes
a steering angle sensor for measuring a parameter indicative of an angular orientation of a vehicle steering mechanism; and
a road speed sensor for measuring a parameter indicative of vehicle road speed;
and wherein the signal processing circuit includes;
a first value generating circuit configured to process an output of the steering angle sensor and an output of the road speed sensor, to provide an output indicative of a desired lean angle of at least a portion of the vehicle;
a second value generating circuit configured to process an output of the road speed sensor, to provide an output comprising a feedforward gain to be applied to the output of the first value generating circuit;
a multiplier circuit for combining the outputs of the first value generating circuit and the second value generating circuit, to provide a multiplier circuit output; and
a summing junction configured to sum the multiplier circuit output and an output of at least one other element, to provide a summing junction output for use in generating the control signal to energize the plurality of valves.

8. A vehicle including a control system in accordance with claim 7.

9. A control system for controlling energization of a plurality of valves in a hydraulic system, the control system comprising:
a plurality of sensors;
a signal processing circuit coupled to the plurality of sensors for determining a desired energization of the plurality of valves dependent upon measurements by at least a portion of the plurality of sensors; and
a driver circuit coupled to the signal processing circuit for generating, responsive to the desired energization of the plurality of valves as determined by the signal processing circuit, a control signal to energize the plurality of valves to the desired energization, wherein the plurality of sensors includes;
a road speed sensor for measuring a parameter indicative of vehicle road speed; and
a steering angle rate sensor for measuring a parameter indicative of a rate of change of an angular orientation of a vehicle steering mechanism;
and wherein the signal processing circuit includes;
a value generating circuit configured to process an output of the road speed sensor, to provide an output indicative of a desired lean angle of at least a portion of the vehicle;
a multiplier circuit for combining the output of the value generating circuit and an output of the steering angle rate sensor, to provide a multiplier circuit output;
a summing junction configured to sum the multiplier circuit output and an output of at least one other element to provide a summing junction output for use in generating the control signal to energize the plurality of valves.

10. A vehicle including a control system in accordance with claim 9.

11. A control system for controlling energization of a plurality of valves in a hydraulic system, the control system comprising:
a plurality of sensors including an occupant seat sensor for detecting the presence of a vehicle occupant;
a signal processing circuit coupled to the plurality of sensors for determining a desired energization of the plurality of valves dependent upon measurements by at least a portion of the plurality of sensors; and
a driver circuit coupled to the signal processing circuit for generating, responsive to the desired energization of the plurality of valves as determined by the signal processing circuit, a control signal to energize the plurality of valves to the desired energization.

12. A vehicle including a control system in accordance with claim 11.

13. A control system for controlling energization of a plurality of valves in a hydraulic system, the control system comprising:
a plurality of sensors;
a signal processing circuit coupled to the plurality of sensors for determining a desired energization of the plurality of valves dependent upon measurements by at least a portion of the plurality of sensors;
a driver circuit coupled to the signal processing circuit for generating, responsive to the desired energization of the plurality of valves as determined by the signal processing circuit a control signal to energize the plurality of valves to the desired energization; and at least one limiting circuit coupled to the driver circuit for limiting a value of an output of the driver circuit.

14. The control system of claim 13 further comprising at least one inverter circuit coupled to the at least one limiting circuit for providing an inverted output of the at least one limiting circuit.

15. A vehicle including a control system in accordance with claim 13.

16. A control system for controlling a plurality of hydraulic actuators operatively coupled to a vehicle for providing a desired configuration of the vehicle, the control system comprising:

a valve system coupled to the plurality of actuators for controlling a flow of pressurized fluid to the plurality of actuators;

a plurality of sensors for measuring vehicle parameters;

an electronic controller coupled to the plurality of sensors an including:

a signal processing circuit for determining a desired energization of the plurality of valves corresponding to the desired configuration of the vehicle, dependent upon measurements by the plurality of sensors; and a driver circuit for generating, responsive to the desired configuration of the vehicle as determined by the signal processing circuit, a control signal to the valve system for controlling the flow of pressurized fluid to the plurality of actuators, to energize the plurality of actuators to provide the desired configuration of the vehicle, wherein the desired configuration of the vehicle is either a first configuration of a plurality of first configuration of the vehicle, or a second configuration of a plurality of second configurations of the vehicle, wherein the plurality of first configurations comprises a plurality of rightward lean angles of at least a portion of the vehicle, and wherein the plurality of second configurations comprises a plurality of leftward lean angles of at least a portion of the vehicle.

17. A vehicle including a control system in accordance with claim 16.

18. A control system for controlling a plurality of hydraulic actuators operatively coupled to a vehicle for providing a desired configuration of the vehicle, the control system comprising:

a valve system coupled to the plurality of actuators for controlling a flow of pressurized fluid to the plurality of actuators;

a plurality of sensors for measuring vehicle parameters;

an electronic controller coupled to the plurality of sensors and including:

a signal processing circuit for determining a desired energization of the plurality of valves corresponding to the desired configuration of the vehicle, dependent upon measurements by the plurality of sensors; and a driver circuit far generating, responsive to the desired configuration of the vehicle as determined by the signal processing circuit a control signal to the valve system for controlling the flow of pressurized fluid to the plurality of actuators, to energize the plurality of actuators to provide the desired configuration of the vehicle, wherein the desired configuration of the vehicle defines a lean angle of at least a portion of the vehicle.

19. The control system of claim 18 wherein the valve system comprises a plurality of proportional control valves.

20. A vehicle including a control system in accordance with claim 18.

* * * * *